(12) United States Patent
Kato

(10) Patent No.: US 6,846,057 B2
(45) Date of Patent: Jan. 25, 2005

(54) PRINTING APPARATUS, METHOD OF CONTROLLING PRINTING APPARATUS, CONTROL PROGRAM, AND COMPUTER READABLE STORAGE MEDIUM STORING CONTROL PROGRAM

(75) Inventor: Takahiro Kato, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/387,437

(22) Filed: Mar. 14, 2003

(65) Prior Publication Data

US 2003/0174183 A1 Sep. 18, 2003

(30) Foreign Application Priority Data

Mar. 18, 2002 (JP) ....................................... 2002-074973
Feb. 12, 2003 (JP) ....................................... 2003-034272

(51) Int. Cl.⁷ .............................................. B41J 29/38
(52) U.S. Cl. ............................................ 347/16; 347/5
(58) Field of Search ................................ 347/16, 5, 37, 347/41, 104, 101

(56) References Cited

U.S. PATENT DOCUMENTS 5,351,068 A * 9/1994 Moon et al. ................. 347/101
5,479,194 A * 12/1995 Hirano et al. ................. 347/22

* cited by examiner

Primary Examiner—Stephen D. Meier
Assistant Examiner—Alfred Dudding
(74) Attorney, Agent, or Firm—Fitzpatrick, Cella, Harper & Scinto

(57) ABSTRACT

The present invention improves so-called fast printing performance by reducing a standby time required to start printing while accomplishing stable high-speed printing and a stable printing grade. Thus, preferably, an operation of moving a print head and an operation of supplying a printing sheet are allowed to temporally overlap each other so that an operation of transporting the printing sheet to a position (printing enabled position) opposite to the print head is completed substantially simultaneously with completion of a preparing operation for the print head.

18 Claims, 20 Drawing Sheets

| SHEET SUPPLYING MEANS | SHEET SUPPLYING START DELAY TIME T2 (ms) |
|---|---|
| CASSETTE | 2500 |
| MANUAL SUPPLYING | 3000 |

FIG.9

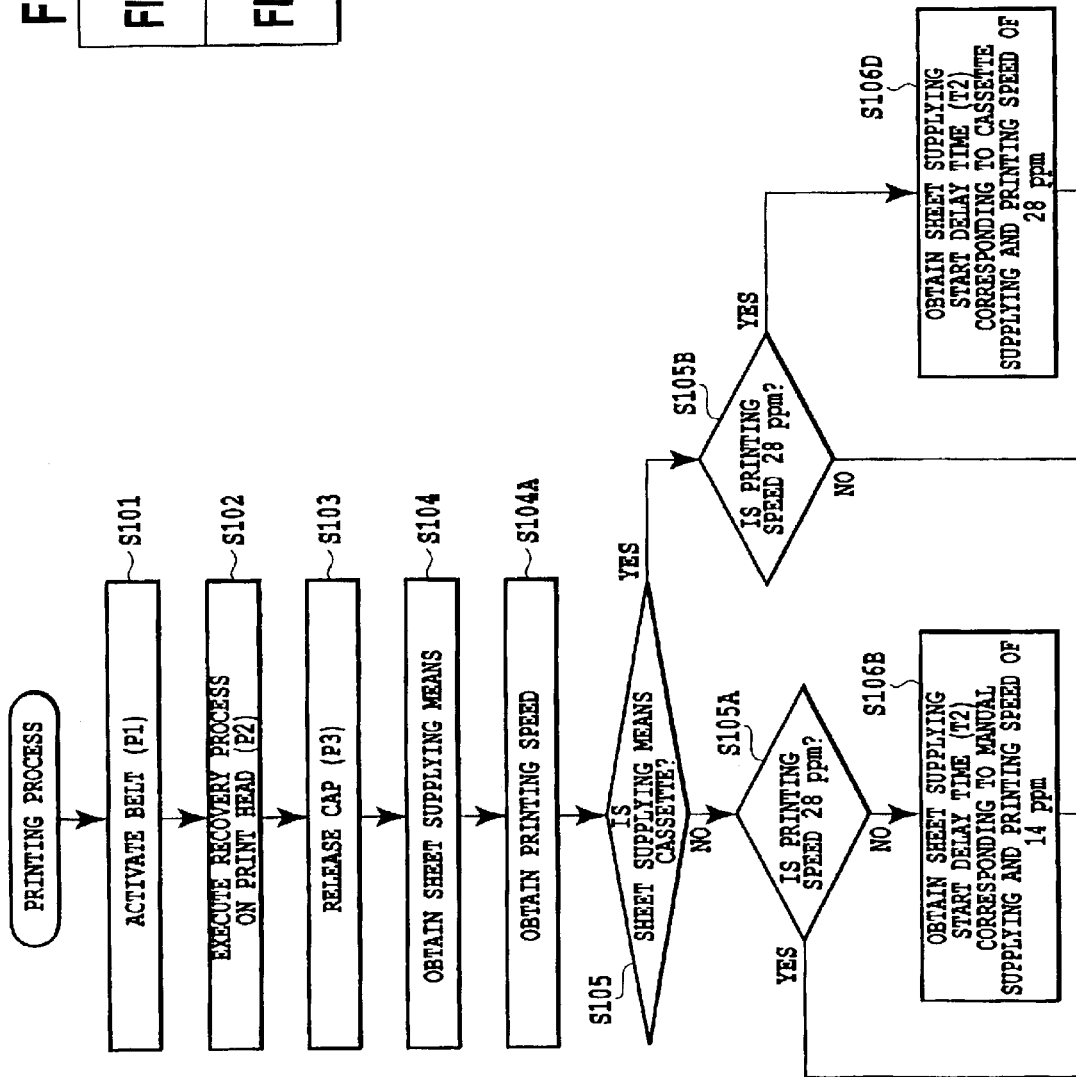

| SHEET SUPPLYING MEANS | PRINTING SPEED (ppm) | SHEET SUPPLYING START DELAY TIME T2 (ms) |
|---|---|---|
| CASSETTE | 28 | 2500 |
| CASSETTE | 14 | 2800 |
| MANUAL SUPPLYING | 28 | 3000 |
| MANUAL SUPPLYING | 14 | 3200 |

FIG.11

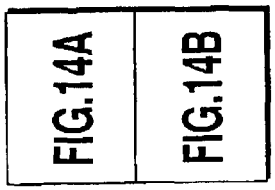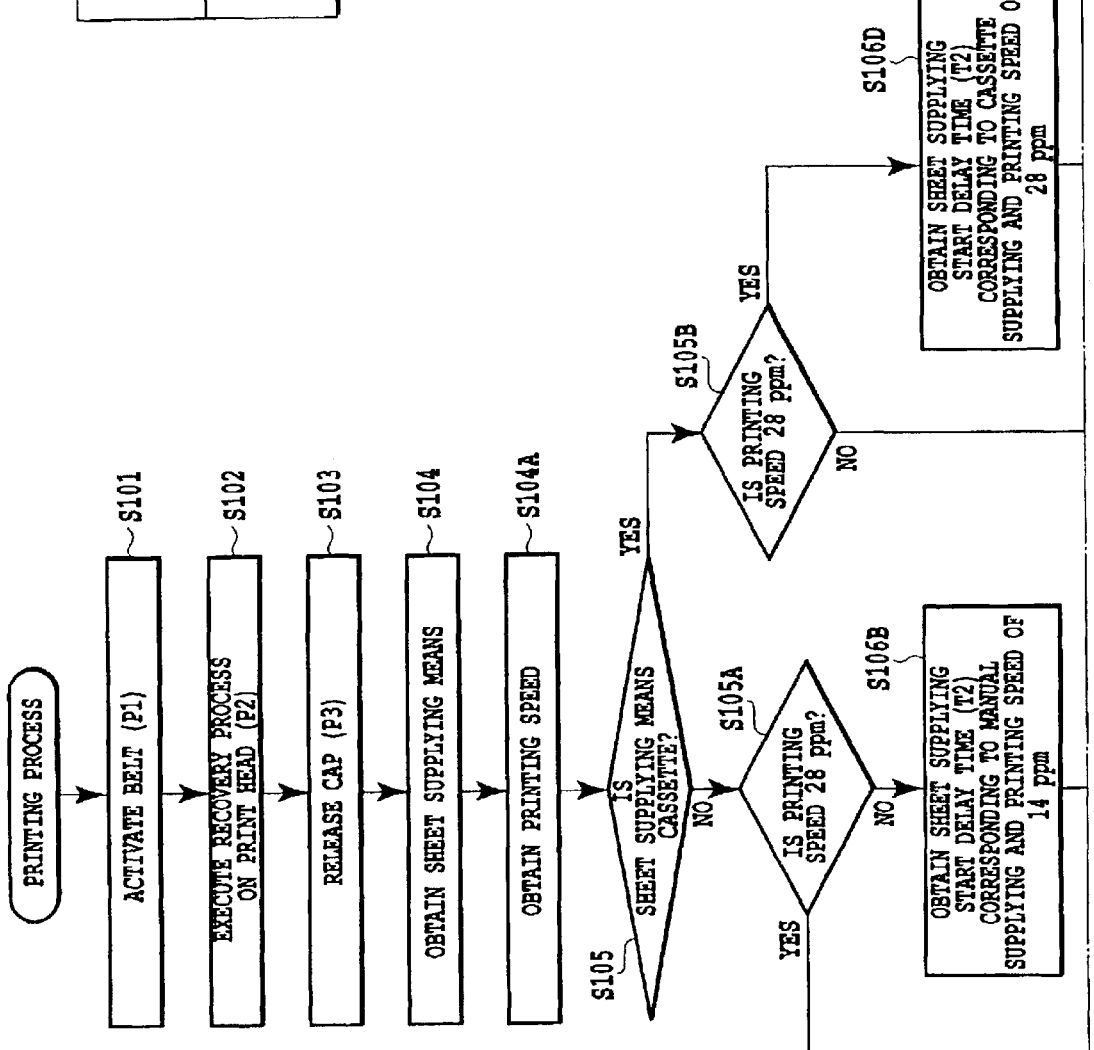

| SHEET SUPPLYING MEANS | SHEET SUPPLYING TIME TB(ms) |
|---|---|
| CASSETTE | 2000 |
| MANUAL SUPPLYING | 1500 |

FIG.16

PRINTING APPARATUS, METHOD OF CONTROLLING PRINTING APPARATUS, CONTROL PROGRAM, AND COMPUTER READABLE STORAGE MEDIUM STORING CONTROL PROGRAM

This application claims priority from Japanese Patent Application Nos. 2002-074973 and 2003-034272 filed Mar. 18, 2002 and Feb. 12, 2003, respectively, which are incorporated hereinto by reference.

BACKGROUND OF THE INVENTION

1. Field of the Invention

The present invention relates to a printing apparatus, a method of controlling the printing apparatus, a control program, and a computer readable storage medium storing the control program. In particular, the present invention can be preferably used for an ink-jet printing apparatus that prints a printing medium such as a paper using an ink-jet print head from which ink can be ejected, and an ink-jet printing apparatus using an elongate line type ink-jet print head.

2. Description of the Related Art

An ink-jet printing apparatus is configured so that a printing medium is printed by ejecting ink from a print head onto the medium. Such a printing apparatus has many advantages. For example, the print head can be easily made compact. High-definition images can be printed at high speed. Running costs are low. Noise is suppressed because of a non-impact method. By using multiple color inks, color images can be printed easily. In particular, it is possible to further increase the printing speed of a full line type printing apparatus using an elongate print head having a large number of ink ejecting ports arranged along a width direction of the printing medium, i.e. a line type print head.

However, in the full line type printing apparatus, the line type print head tends to be large and heavy. It thus takes much time to transfer the print head from a standby state during a non-printing period to a printing enabled state.

For example, during the non-printing period, a cap covering the ink ejecting ports in the print head prevents a nozzle section from becoming dry. When a printing operation is started, the cap must be removed. Accordingly, much time is required before a printing process can be started. As a result, in particular, it takes much time to print the first page (first print).

SUMMARY OF THE INVENTION

It is an object of the present invention to provide a printing apparatus, a method of controlling the printing apparatus, a control program, and a computer readable storage medium storing the control program that can improve so-called fast printing performance by reducing a standby time required before a printing process can be started, while accomplishing stable fast printing and a stable printing grade.

In the first aspect of the present invention, there is provided a printing apparatus performing, according to an input print start signal, a preparing operation for a print head used to print a printing medium and a transporting operation of transporting the printing medium to a position which is opposite the print head and at which a printing process can be executed using the print head, the apparatus comprising:

control means for controlling the preparing operation for the print head and the transporting operation of the printing medium so that one of these operations is started before the other operation is completed.

In the second aspect of the present invention, there is provided a control method of controlling a printing apparatus performing, according to an input print start signal, a preparing operation for a print head used to print a printing medium and a transporting operation of transporting the printing medium to a position which is opposite the print head and at which a printing process can be executed using the print head, the method comprising:

a control step of controlling the preparing operation for the print head and the transporting operation of the printing medium so that one of these operations is started before the other operation is completed.

In the third aspect of the present invention, there is provided a control program for using a computer to control a printing apparatus performing, according to an input print start signal, a preparing operation for a print head used to print a printing medium and a transporting operation of transporting the printing medium to a position which is opposite the print head and at which a printing process can be executed using the print head, the program comprising:

a code for a step of controlling the preparing operation for the print head and the transporting operation of the printing medium so that one of these operations is started before the other operation is completed.

In the fourth aspect of the present invention, there is provided a computer readable storage medium storing a control program for using a computer to control a printing apparatus performing, according to an input print start signal, a preparing operation for a print head used to print a printing medium and a transporting operation of transporting the printing medium to a position which is opposite the print head and at which a printing process can be executed using the print head, wherein the control program includes a code for a step of controlling the preparing operation for the print head and the transporting operation of the printing medium so that one of these operations is started before the other operation is completed.

According to the present invention, a print head preparing operation and an operation of transporting (supplying) a printing medium are controlled so that one of the operations is started before the other operation is completed. This serves to reduce the time required for a preparing operation performed after a print request has been issued and before a printing process is started. As a result, it is possible to reduce the time required for printing. Further, operations of moving the print head and feeding a printing medium are allowed to temporally overlap each other so that the point of time when the print head preparing operation (head moving operation) is completed substantially coincides with the point of time when the operation of transporting the printing medium to a printing enabled position is completed. Thus, the operation of transporting the printing medium to the position (printing enabled position) opposite to the print head must be completed substantially simultaneously with the completion of the print head preparing operation.

The above and other objects, effects, features and advantages of the present invention will become more apparent from the following description of embodiments thereof taken in conjunction with the accompanying drawings.

BRIEF DESCRIPTION OF THE DRAWINGS

FIG. 9 is a chart illustrating a sheet feeding start delay time table used in the printing process in FIG. 8;

FIG. 10 is a flow chart showing the relationship between FIG. 10A and FIG. 10B;

FIG. 10A is a flow chart illustrating a printing process according to a second embodiment of the present invention;

FIG. 11 is a chart illustrating a sheet feeding start delay time table used in the printing process in FIG. 10;

FIG. 14 is a flow chart showing the relationship between FIG. 14A and FIG. 14B;

FIG. 14A is a flow chart illustrating a printing process according to a tenth embodiment of the present invention;

FIG. 16 is a chart of an example storing sheet feeding times used in the tenth embodiment of the present invention are stored.

DETAILED DESCRIPTION OF PREFERRED EMBODIMENTS

Figure 1:
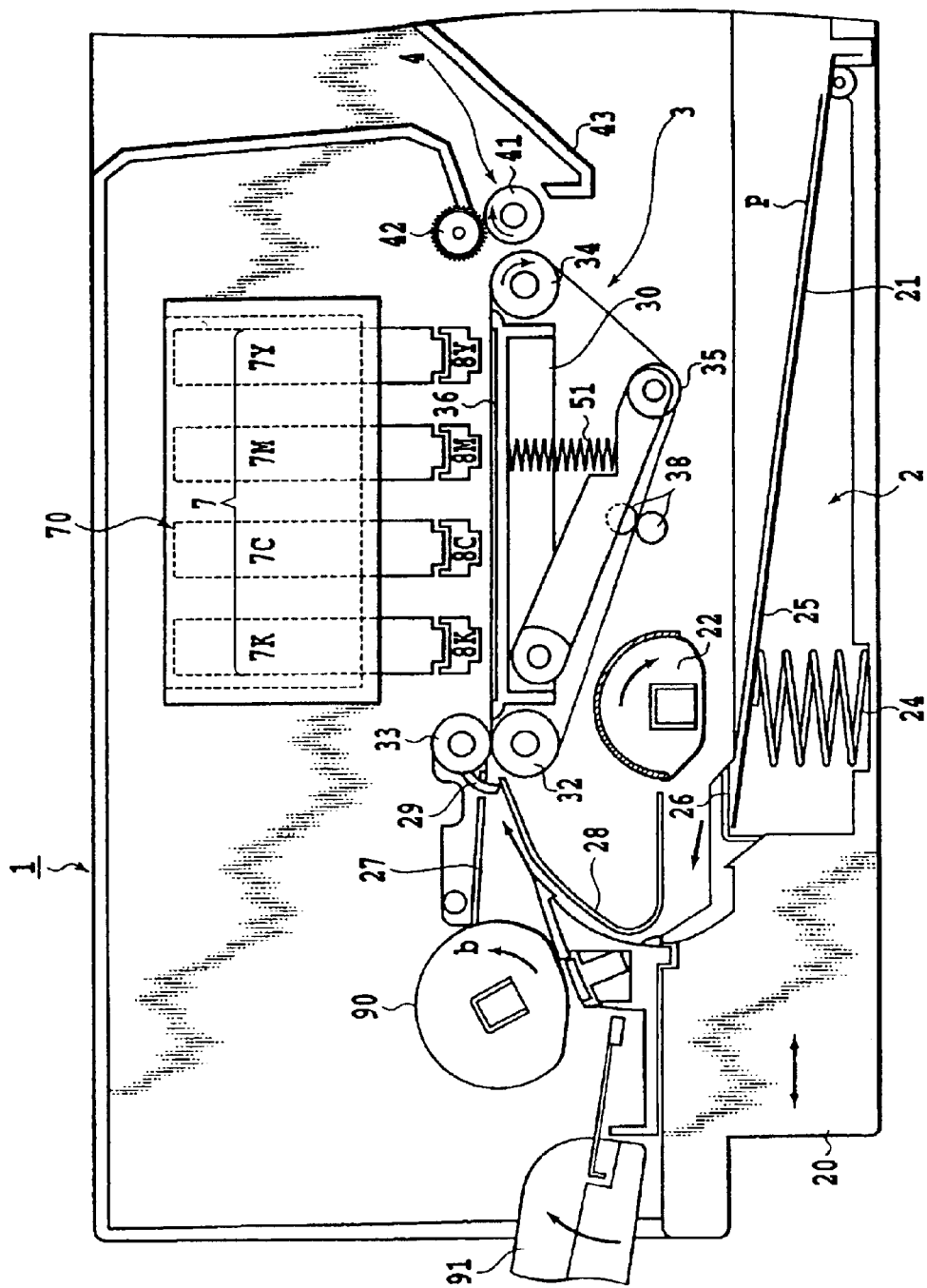
FIG. 1 is a schematic sectional view of an entire printing apparatus according to a first embodiment of the present invention.
Figure 2:
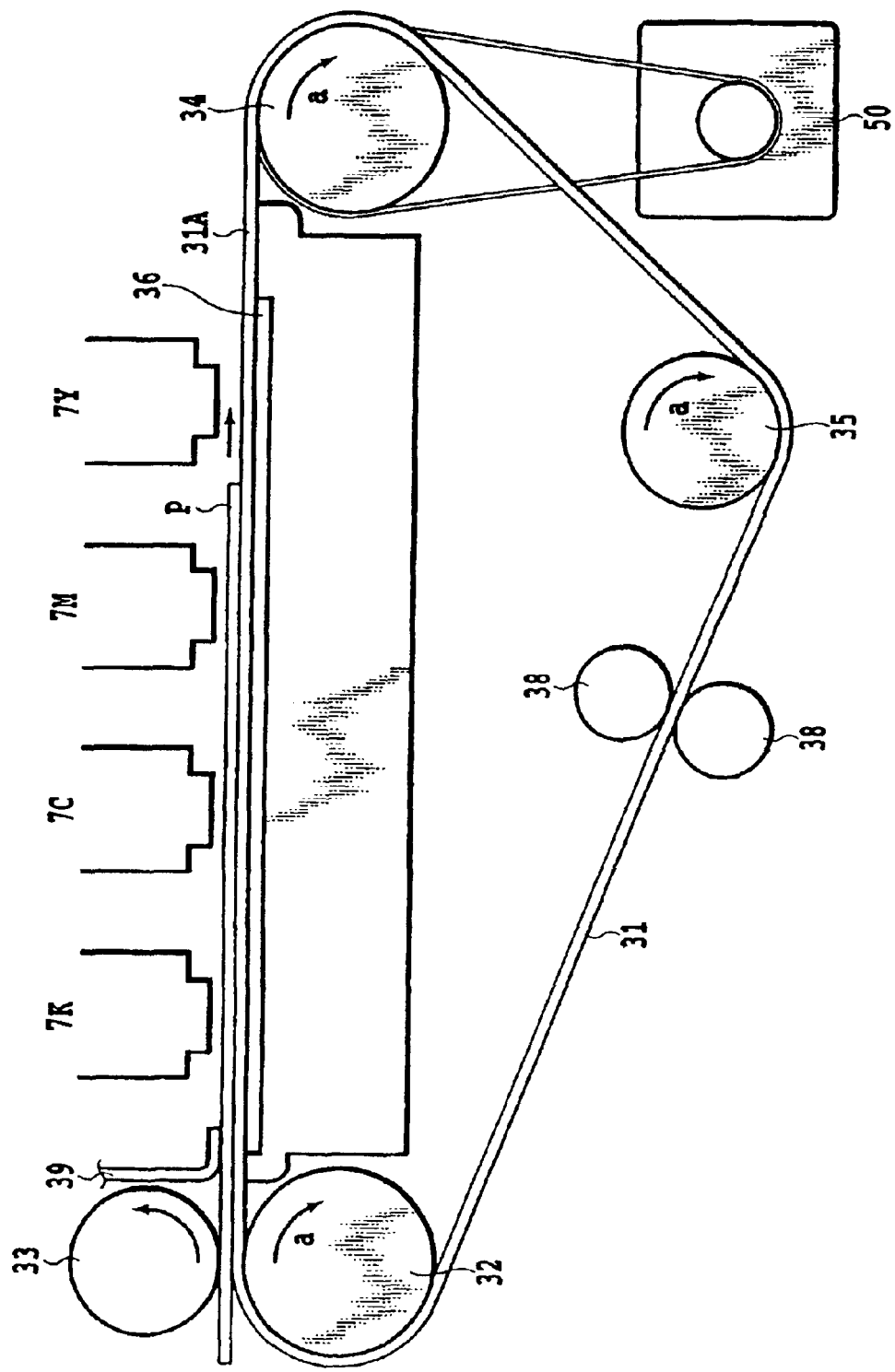
FIG. 2 is a schematic sectional view of a sheet feeding section of the printing apparatus in FIG. 1.

Embodiments of the present invention will be described with reference to the drawings.
First Embodiment FIGS. 1 and 2 illustrate the internal structure of an ink-jet printing apparatus according to the present invention. A printing apparatus 1 having an automatic sheet feeding apparatus includes a sheet supplying section 2, a sheet feeding section 3, a sheet discharging section 4, and a print head section 70. First, these sections, constituting the apparatus, will be sequentially described. In this regard, FIG. 1 is a sectional view showing a configuration of an entire printing apparatus 1. FIG. 2 is a sectional view showing a configuration of the sheet feeding section of the printing apparatus 1. With reference to these figures, description will be given of the (I) sheet supplying section 2, (II) sheet feeding section 3, (III) print head section 70, and (IV) sheet discharging section 4.

(I) Sheet Supplying Section

The sheet supplying section 2 includes a pressure plate 21 on which printing sheets (printing media) P are mounted and a supplying rotator 22 feeds the printing sheet P. These two components are mounted on a base 20. The pressure plate 21 can rotate around a rotating shaft coupled to the base 20 and is urged toward the supplying rotator 22 by a pressure plate spring 24. A separating pad 25 composed of material such as artificial leather which has a large coefficient of friction is provided in a portion of the pressure plate 21 which is opposite the supplying rotator 22, in order to prevent a plurality of printing sheets P from being fed at a time. Furthermore, the base 20 is provided with a separating pawl 26 that covers a corner portion of printing sheets P in one direction to separate them from each other and a release cam that releases the pressure of the pressure plate 21 against the supplying rotator 22.

With such a configuration, in a standby state, the release cam pushes the pressure plate 21 down to a predetermined position. This releases the pressure of the pressure plate 21 against the supplying rotator 22. When the printing sheet P is fed, driving force of a conveying roller 32 is transmitted to the supplying rotator 22 and the release cam via gears and the like. Then, by the release cam deviates from the pressure plate 21, the pressure plate rises. Therefore, the supplying rotator 22 presses the printing sheet P. As the supplying rotator 22 rotates, a supplying operation is started by picking up the printing sheet P. The printing sheets P are separated from one another by the separating pawl 26 and then fed to the sheet feeding section 3. The supplying rotator 22 rotates until all required the print sheet P is fed into the sheet feeding section 3. Then, the pressure of the supplying rotator 22 against the print sheets P is released to bring the apparatus into a standby state. This stops the transmission of the driving force from the conveying roller 32.

Reference numeral 90 denotes a manual sheet supplying rotator. A printing sheet P installed on a manual sheet supplying tray 91 is fed by the supplying rotator 90 according to a print command signal from a computer. The print sheet P is then supplied to a conveying roller 32 section.

(II) Sheet Feeding Section

The sheet feeding section 3 has a conveying belt 31 that sucks and conveys the printing sheet P and a PE (paper edge) sensor (not shown). The conveying belt 31 is wound between a driving roller 34, the conveying roller 32 and a pressure roller 35. The rollers 32 and 35 are idler rollers. The conveying belt 31 is driven by the driving roller 34.

A pinch roller 33 that follows the conveying belt 31 is provided opposite the conveying roller 32. The pinch roller 33 is pressed and contacted with the conveying belt 31 by a spring (not shown) to guide the printing sheet P to the printing section. Furthermore, an upper guide 27 and a lower guide 28 that guide the printing sheet P are disposed at an inlet of the sheet conveying section 3, to which the printing sheet P is conveyed. Further, the upper guide 27 is provided with a PE sensor lever 29. On the basis of movement of the PE sensor lever 29, the PE sensor (not shown) detects the leading and trailing ends of the printing sheet P. Moreover, a print head section 70 that forms images on the basis of image information is provided on the downstream side of the conveying roller 32 in the direction in which the printing sheet P is conveyed.

With this configuration, the printing sheet P which has been fed to the sheet feeding section 3 is conveyed to between the conveying roller 32 and the pinch roller 33 while being guided by the upper guide 27 and the lower guide 28. At this time, the leading end of the conveyed printing sheet P is detected using the PE sensor lever 29. On the basis of this detection, a printing position of the printing sheet P is determined. Further, the printing sheet P is conveyed downward to the print head as the conveying belt 31 rotates. In this connection, the conveying belt 31 rotates in union with rotation of the conveying roller 32. The conveying roller 32 is rotated using a supersonic motor, described later, as a driving source.

(III) Print Head Section

The print head section 70 in this example comprises a plurality of line type ink-jet print heads. Each of the print heads has a plurality of nozzles arranged in a direction orthogonal to the conveying direction of the printing sheet P (in FIGS. 1 and 2, a direction from the reader to the drawings). These print heads include a print head 7K from which black ink (K) is ejected, a print head 7C from which cyan ink (C) is ejected, a print head 7M from which magenta ink (M) is ejected, and a print head 7Y from which yellow ink (Y) is ejected. These print heads are arranged in this order at predetermined intervals from upstream to downstream sides in the conveying direction of the printing sheet P (These print heads may be collectively referred to as the "print head 7"). A manner of ejecting ink from the print head 7 is arbitrary. Ink may be ejected by, for example, using a heater or the like to heat the ink. In this case, heat from the heater or the like causes film boiling in the ink to generate bubble in it. The growth of the bubble changes the pressure on the ink. Consequently, ink can be ejected through ink ejecting port formed at the lower end of the print head 7. The ink ejecting ports constitute the ink nozzles. An image is then formed on the printing sheet P using the ink ejected downward through the ink ejecting port.

During a non-printing period, the ejecting port sections of the print heads 7 are covered with corresponding caps 8K, 8C, 8M, and 8Y (these will be collectively referred to as a "cap 8" below) to hinder the ink in the nozzles from becoming dry. The print head section 70 comprises a mechanism (not shown) that can move the print head 7 up and down and a mechanism (not shown) that can slide the caps 8K, 8C, 8M, and 8Y along the conveying direction of the printing sheet P. When a printing is performed, as described later, these mechanisms removes the cap 8, which has covered the ejecting ports in the print head 7. Then, the ejecting ports in the print head 7 approaches the vicinity of the conveying belt 31.

An ink absorbent is accommodated in the cap 8. When ink is ejected from the print head 7 covered with the cap 8, it is absorbed and held by the ink absorbent.

(IV) Sheet Discharging Section

The sheet discharging section 4 is provided with a sheet discharging roller 41 and a spur 42. The printing sheet P on which an image has been formed by the printing section is conveyed while being sandwiched between the sheet discharging roller 41 and the spur 42. The printing sheet P is then discharged onto a sheet discharging tray 43.

Now, with reference to FIGS. 1 and 2, description will be given of sucking and conveying arrangements and operations of the printing section.

Reference numeral 31 denotes a conveying belt that moves while sucking and holding the printing sheet P. The conveying belt 31 is formed of a synthetic resin such as polyethylene or polycarbonate so as to have a thickness of about 0.1 mm to 0.2 mm. The conveying belt 31 is endless. Reference numeral 36 denotes suction force generating means fixed so as to lie opposite the print head 7. The suction force generating means 36 is connected to a high-voltage power supply (not shown) that generates a predetermined high voltage. Upon receiving a voltage of about 0.5 kV to 10 kV, the suction force generating means 36 exerts suction force on a portion of the conveying belt 31 which is opposite the printing head 7. Reference numerals 32, 33, and 34 denote rollers that supports the conveying belt 31 so as to apply appropriate tension to it, as described above. The roller 34 is coupled to a sheet feeding motor 50. Further, as pressing means for pressing the printing sheet P against the conveying belt 31, a sheet pressing member 39 is attached so as to rotate around the axis of rotation of the pinch roller 33. The sheet pressing member 39 is composed of a conductive metal plate and is urged toward the conveying belt 31 by urging means (not shown).

Reference numeral 38 denotes a pair of cleaning rollers provided so as to sandwich the conveying belt 31 between themselves under pressure. The pair of rollers 38 can absorb ink to remove contaminants such as ink which adhere to the conveying belt 31. The cleaning rollers 38 are sponges having a small pore diameter (preferably 10 $\mu$m to 30 $\mu$m) in order to prevent their being degraded.

Now, a sucking and conveying operations will be described.

The printing sheet P is guided to the printing section while being sandwiched between the pinch roller 33 and the conveying belt 31. Then, the printing sheet P enters the suction force generating section while being pressed against the conveying belt 31 by the sheet pressing member 39. The printing sheet P is then sucked to a planar portion of the conveying belt 31 by suction force generated by the suction force generating means 36. Subsequently, the printing sheet P is conveyed in the direction of an arrow a by the sheet feeding motor 50 and the roller 34 while the print head is performing a printing operation. At this time, an image can be precisely printed with the print head 7 held close to the printing sheet P because the conveying belt 31, which holds the printing sheet P, has no portions projecting upward from the printing sheet P. That is, the conveying belt 31 has no members projecting toward the print head 7 at the leading or trailing end portion of the printing sheet P. Accordingly, the print head 7 can print image even at an end portion of the printing sheet P with its ejecting ports held close to this portion. As a result, images can be precisely printed.

Further, if a large amount of ink is ejected to the printing sheet P, the printing sheet P may be swollen and cockled. However, even in this case, the printing sheet P can be prevented from rising toward the print head 7 by causing the printing sheet P to adhere to the conveying belt 31 using the suction force of the suction force generating means 36 and pressure exerted by the sheet pressing member 39. As a result, a stable printing process can be accomplished while avoiding contact of the print head 7 with the printing sheet P. Further, even if an end portion of the printing sheet P is cockled or curled owing to a change in environment such as a change in temperature or humidity, the printing sheet P can be pressed against the conveying belt 31 by the sheet pressing member 39 to eliminate the cockles or curls from the printing sheet P before it is conveyed to the suction force generating section. As a result, the printing sheet P can be properly held at the printing section.

Figure 3:
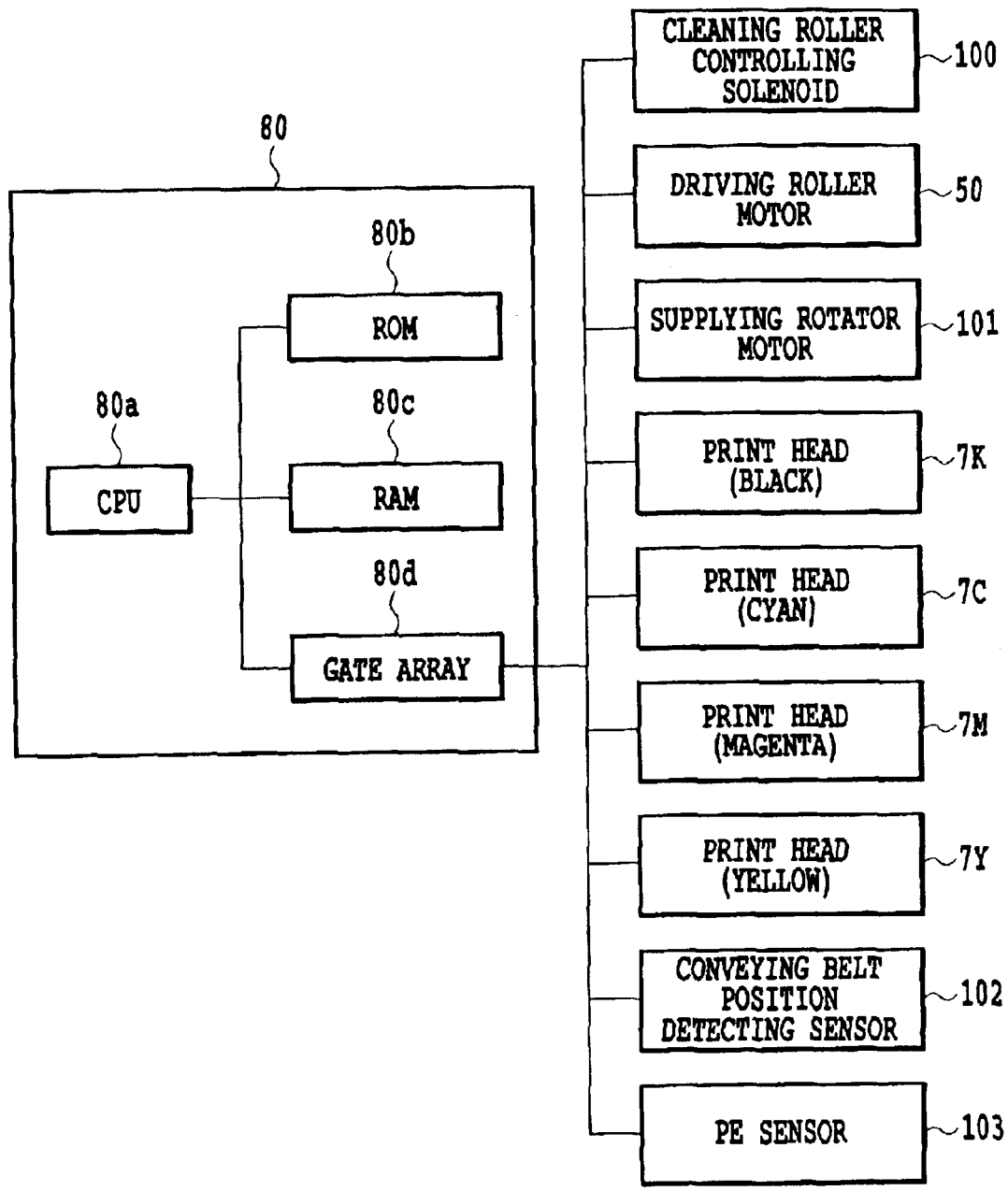
FIG. 3 is a block diagram of a control section of the printing apparatus in FIG. 1.

FIG. 3 is a block diagram illustrating the relationship between a control section of the present ink-jet printing apparatus and devices controlled by the control section.

As preciously described, reference numerals 7K, 7C, 7M, and 7Y denote the black, cyan, magenta, and yellow print heads, respectively. Reference numeral 100 denotes a solenoid used to control the pair of cleaning rollers 38. Reference numeral 50 denotes a motor that drives the driving roller 34 for the conveying belt 31. Reference numeral 102 denotes a sensor used to detect a reference position of the conveying belt 31. Although not shown in FIG. 1 or 2, the conveying belt position detecting sensor 102 is provided between the conveying roller 32 and the pressure roller 35 and opposite a back surface of the conveying belt 31. Reference numeral 103 denotes a sensor used to detect the ends of the printing sheet P and connected to the PE sensor lever 29.

In a control section 80, reference numeral 80*a* denotes a CPU, and reference numeral 80*b* denotes a ROM in which programs are stored. Reference numeral 80*c* denotes a work memory for controlling, and reference numeral 80*d* denotes a gate array. All these components are connected together via a system bus. The following signals are transmitted and received via the gate array 80*d*: control signals for the driving roller motor 50 and the supplying rotator motor 101, control signals for the solenoid 100 used to control the cleaning rollers, image signals to the print head 7, control signals for the print head 7, and information from the contamination detecting sensor for the conveying belt 31 or the PE sensor.

Figure 4:
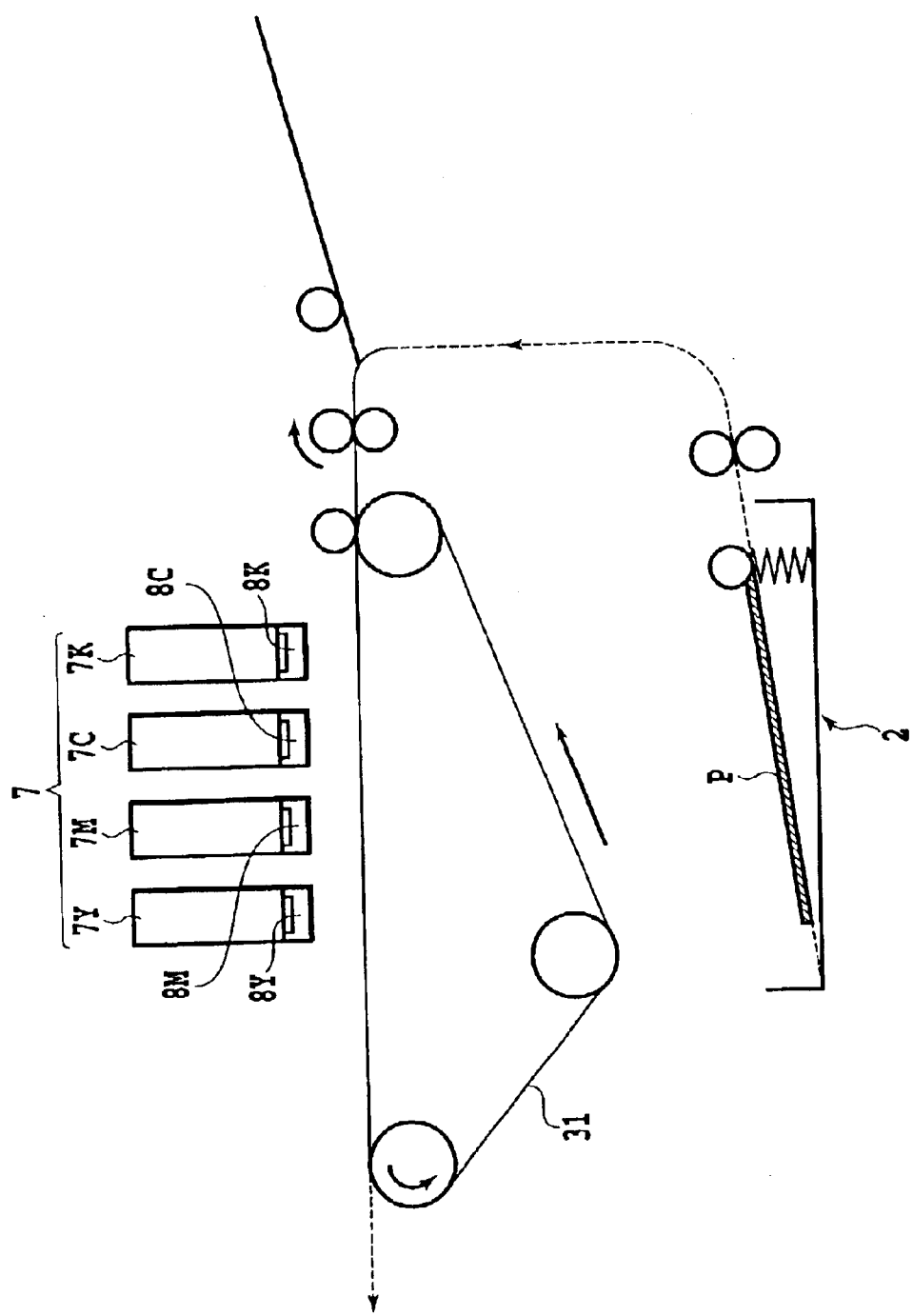
FIG. 4 is a diagram illustrating the positional relationship between a print head in the printing apparatus in FIG. 1 and a print sheet during a non-printing period.
Figure 5:
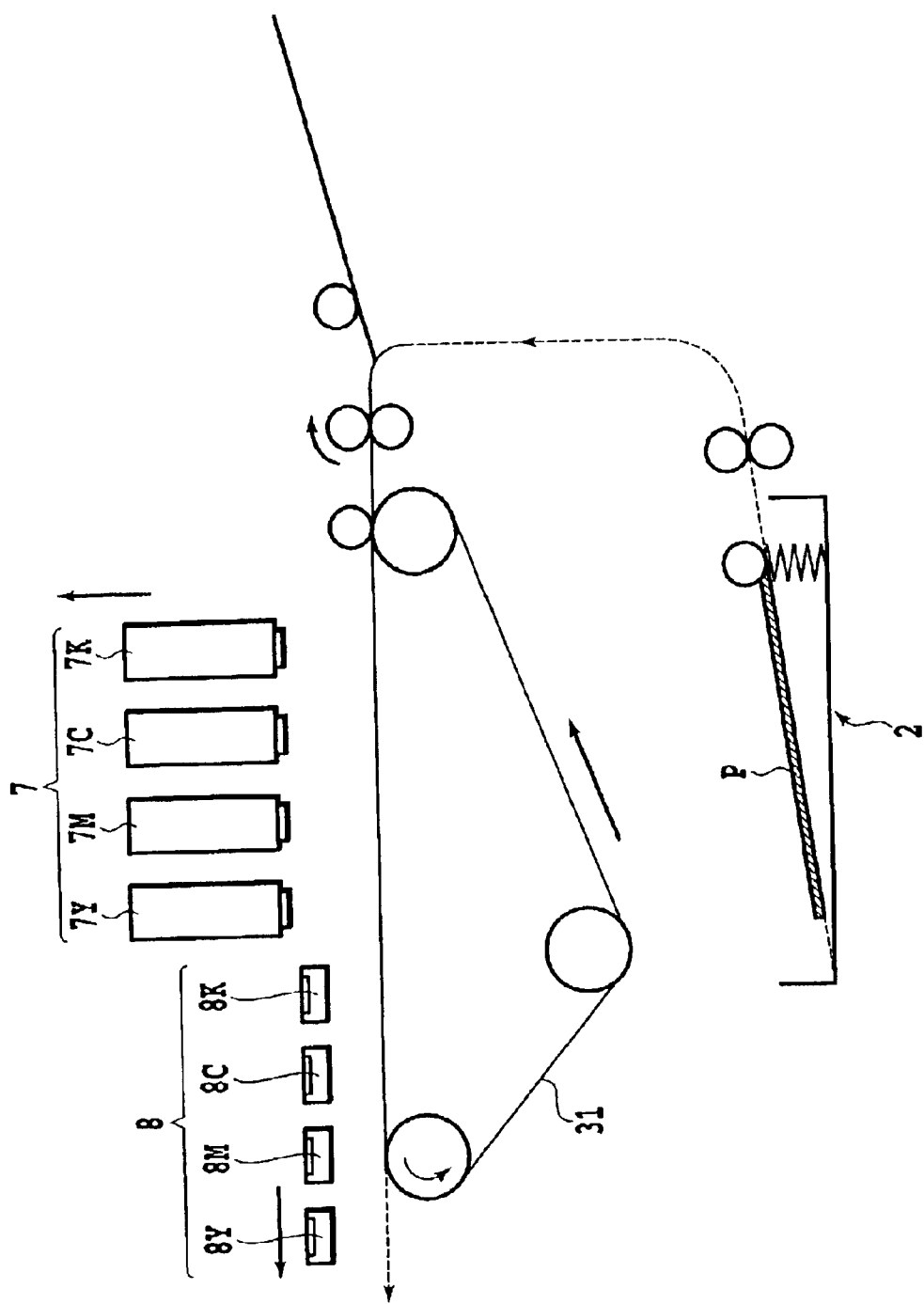
FIG. 5 is a diagram illustrating the positional relationship between a print head in the printing apparatus in FIG. 1 and a print sheet during an operation of removing a cap.
Figure 6:
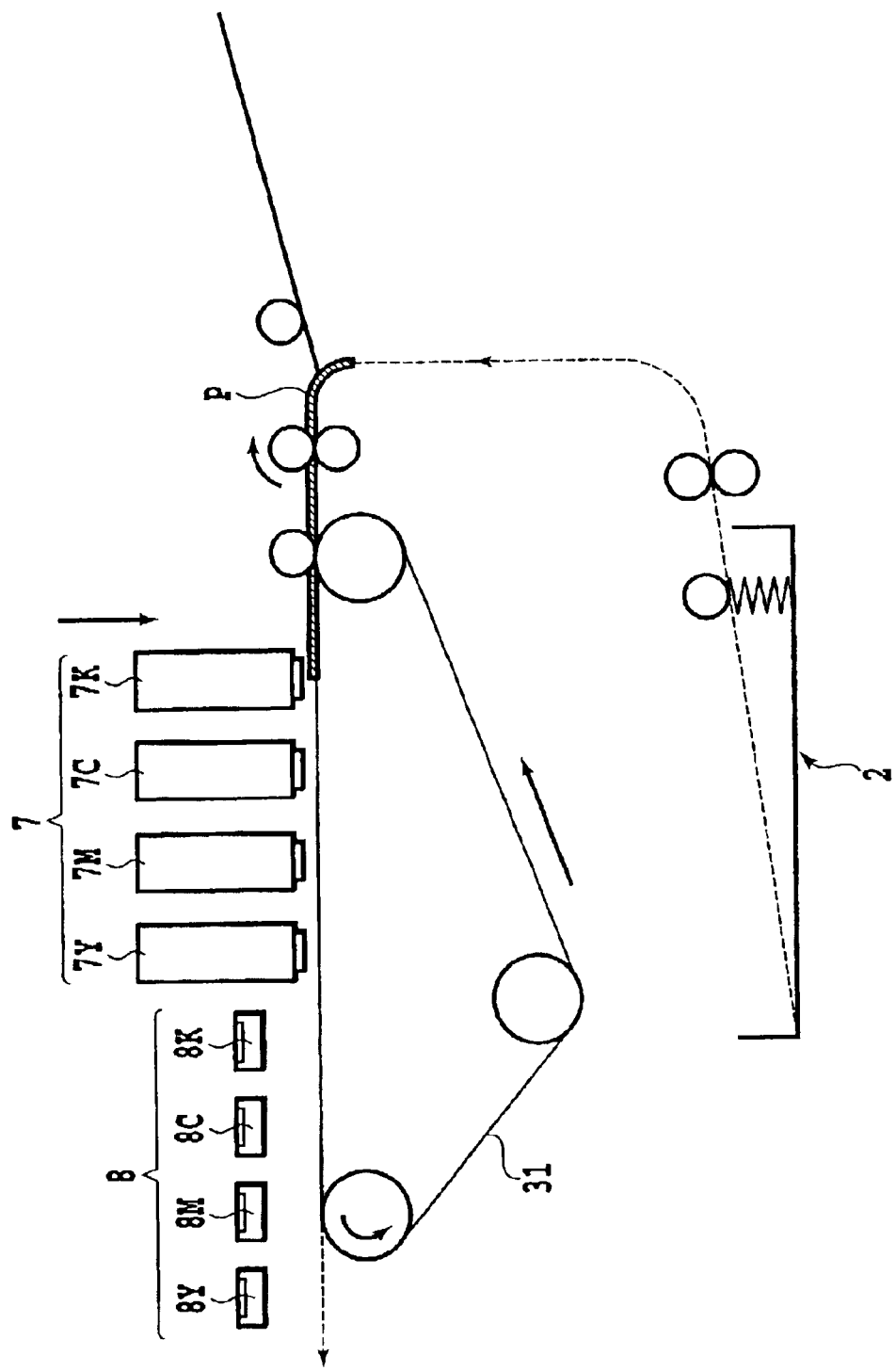
FIG. 6 is a diagram illustrating the positional relationship between a print head in the printing apparatus in FIG. 1 and a print sheet during movement of the print head.

FIGS. 4, 5, and 6 illustrate changes in the state of the print head 7, cap 8, conveying belt 31, and printing sheet P observed when a printing process is started. The broken lines in these figures indicate a supplying path from the sheet supplying section 2 to the conveying belt 31 through which the printing sheet P is fed and a discharging path from the conveying belt 31 to the sheet discharging tray 43.

FIG. 4 shows a state during a non-printing period (immediately before the start of printing). In this state, the print head 7 (7K, 7C, 7M, and 7Y) is positioned above and separate from the conveying belt 31, with the ejecting ports covered with the corresponding cap 8. Further, the conveying belt 31 is stopped, and the printing sheet P is positioned in the sheet supplying section 2.

FIG. 5 shows a state observed after in the state shown in FIG. 4, a print request has been received (a print start signal is input to the apparatus) and before a printing operation is enabled. In the state shown in FIG. 5, the print head 7 retreats upward, and the cap 8 then slides downstream side in the conveying direction of the printing sheet P. The cap 8 then retreats from its position directly below the print head 7. The cap 8 is thus removed. Further, the conveying belt 31 has already been activated. The printing sheet P is now positioned in the sheet supplying section 2.

FIG. 6 shows the printing enabled state. In this state, the print head 7 has already completed an operation of lowering down to a predetermined ink ejection enabled position close to the conveying belt 31. Further, the conveying belt 31 has already been activated. The printing sheet P is conveyed to the conveying belt 31 from the sheet supplying section 2 via the sheet supplying path, shown by the broken line in the figure. The printing sheet P is first conveyed on the conveying belt 31 to directly below the print head 7K.

Figure 7A:
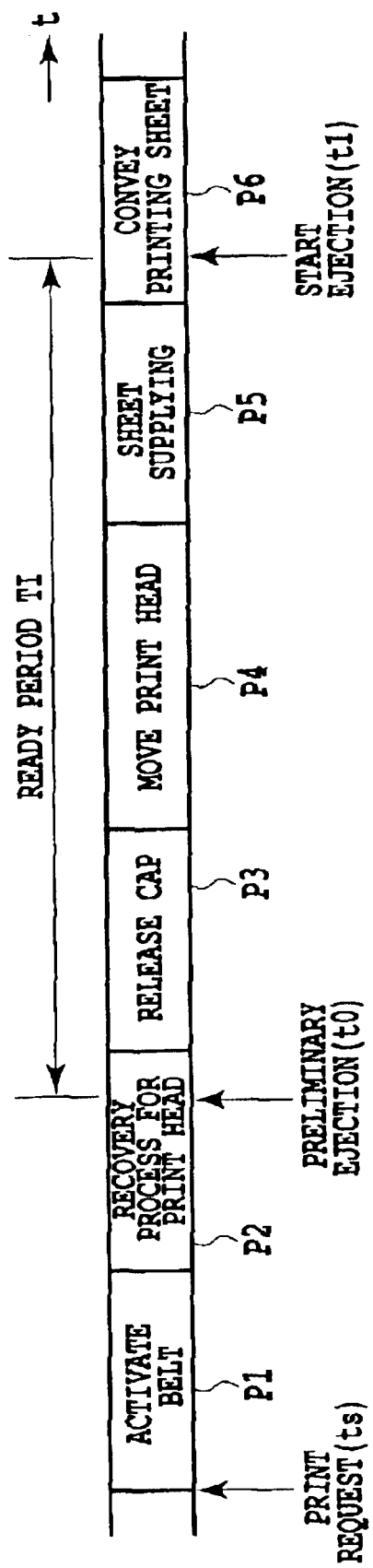
FIG. 7A is a diagram illustrating a mode of a printing process executed by a conventional printing apparatus.
Figure 7B:
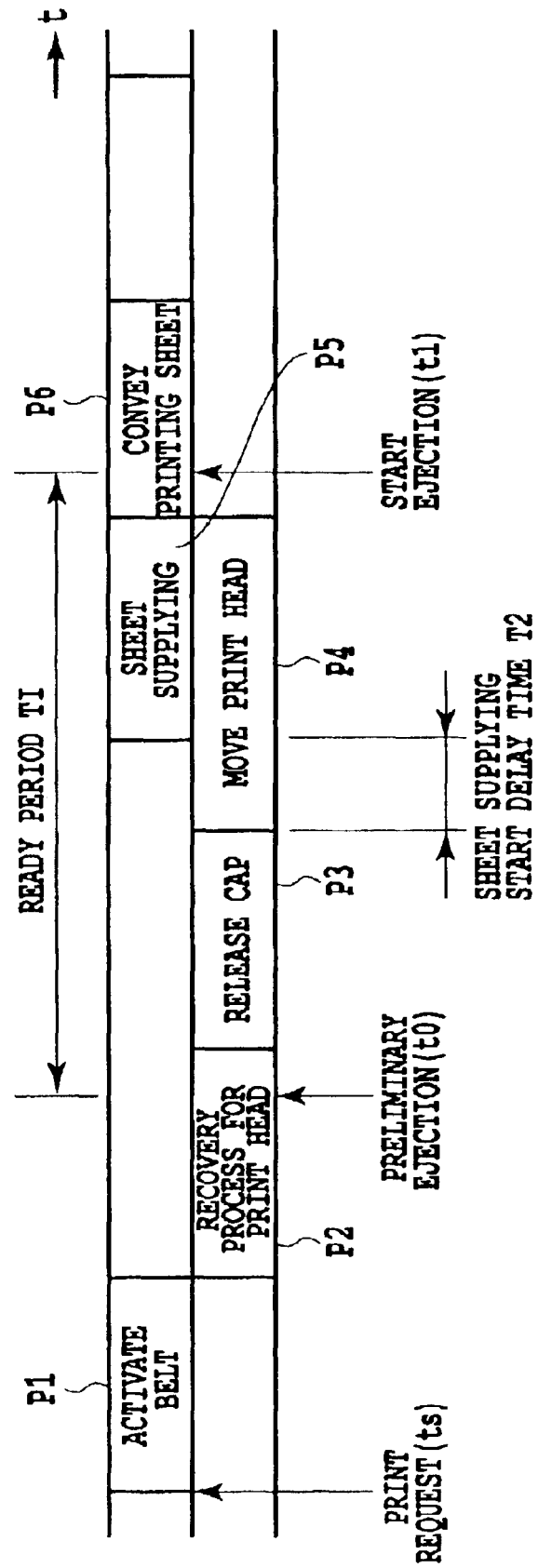
FIGS. 7B and 7C are diagrams illustrating a different mode of a printing process executed by the printing apparatus according to the present invention.
Figure 7C:
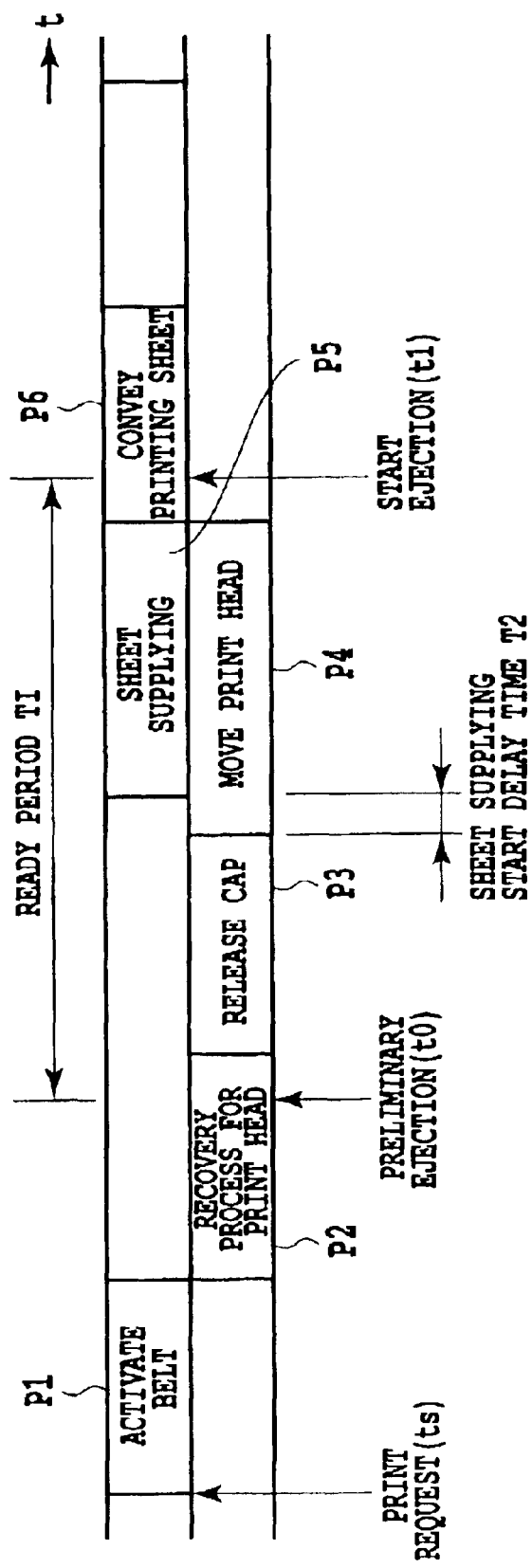

FIGS. 7A, 7B, and 7C illustrate the case in which a series of operations (P1 to P6) performed when a printing process is started are combined together in different manners. A ready period T1 in these figures refers to a time from the point of time t0 to the point of time t1. At time t0, preliminary ejection is completed during a recovery process (P2) for the print head 7, described later. At time t1, ink ejection is started during a conveying operation (P6) for the printing sheet P, described later. The ready period T1 is desirably as short as possible. Reducing the ready period T1 serves to reduce the total time required to print a single printing sheet.

In FIGS. 7A, 7B, and 7C, reference character ts denotes the point of time at which a print request is received (a print start signal is input). At the point of time ts, the conveying belt 31 is activated (P1). The print head recovery process (P2) is executed to favorably maintain the ink ejecting performance of the print head 7. Specifically, this process includes a discharging process, an ejecting process (preliminarily ejecting) and a process of wiping a surface of the print head 7 in which the ejecting ports are formed. In the discharging process and the ejecting process (preliminarily ejection), ink not involved in printing is discharged and ejected through the ejecting ports in the print head 7. The following are examples of the recovery process of discharging ink from the print head 7 through its ejecting ports: a pressurizing recovery process of pressurizing the ink in the print head 7 to discharge it and a sucking recovery process of introducing a negative pressure in the cap 8, which caps the print head 7, to suck and discharge the ink into the cap 8. In the present example, preliminary ejection is carried out at least at the end of the recovery process (P2). A cap releasing operation (P3) comprises releasing capping as shown in FIG. 5. A print head moving operation (P4) comprises lowering the print head 7 as shown in FIG. 6. Further, a sheet supplying operation (P5) comprises supplying the printing sheet P from the sheet supplying section 2 onto the conveying belt 31. A sheet conveying operation (P6) comprises using the conveying belt 31 to convey the printing sheet P.

FIG. 7A shows a conventional example of a series of operations performed when a printing process is started. The operations (P1 to P6) required for printing are sequentially performed one by one.

FIG. 7B shows an example in which the print head moving operation (P4) and the sheet supplying operation (P5) are allowed to temporally overlap each other. The overlapping of both operation periods serves to reduce the ready period T1. The configuration of the present ink-jet printing apparatus requires a relatively long time to move the plurality of (four) elongate type print head 7 from the position at which they are covered with the corresponding caps 8 to the position at which ink ejection is enabled. By supplying the printing sheet P from the sheet supplying section 2 to the conveying belt 31 (P5) during the movement of the print head (P4), the printing sheet P can be passed directly below the print head 7K, located on the most upstream side in the conveying direction of the printing sheet P, immediately after the print head 7 has completed an operation of moving to the predetermined ink ejection enabled position close to the conveying belt 31. Thus, a time t2 from the start of the moving operation (P4) to the start of the sheet supplying operation (P5) is set in order to match the points of time at which the moving operation (P4) and the sheet supplying operation (P5) are completed, with each other. The time T2 is defined as a sheet supplying start delay time.

FIGS. 7C, like FIG. 7B, shows an example in which the print head moving operation (P4) and the sheet supplying operation (P5) are allowed to temporally overlap each other. In this example, the time required for the sheet supplying operation (P5) is longer than in FIG. 7B because of, for example, the use of sheet supplying means with a longer sheet supplying path. In the present example, an appropriate sheet supplying start timing can be accomplished by reducing the sheet supplying start delay time T2 according to the time required for the sheet supplying operation (P5).

Now, with reference to the flow chart in FIG. 8, description will be given of a method of reducing the ready period T1 according to the present example.

Figure 8:
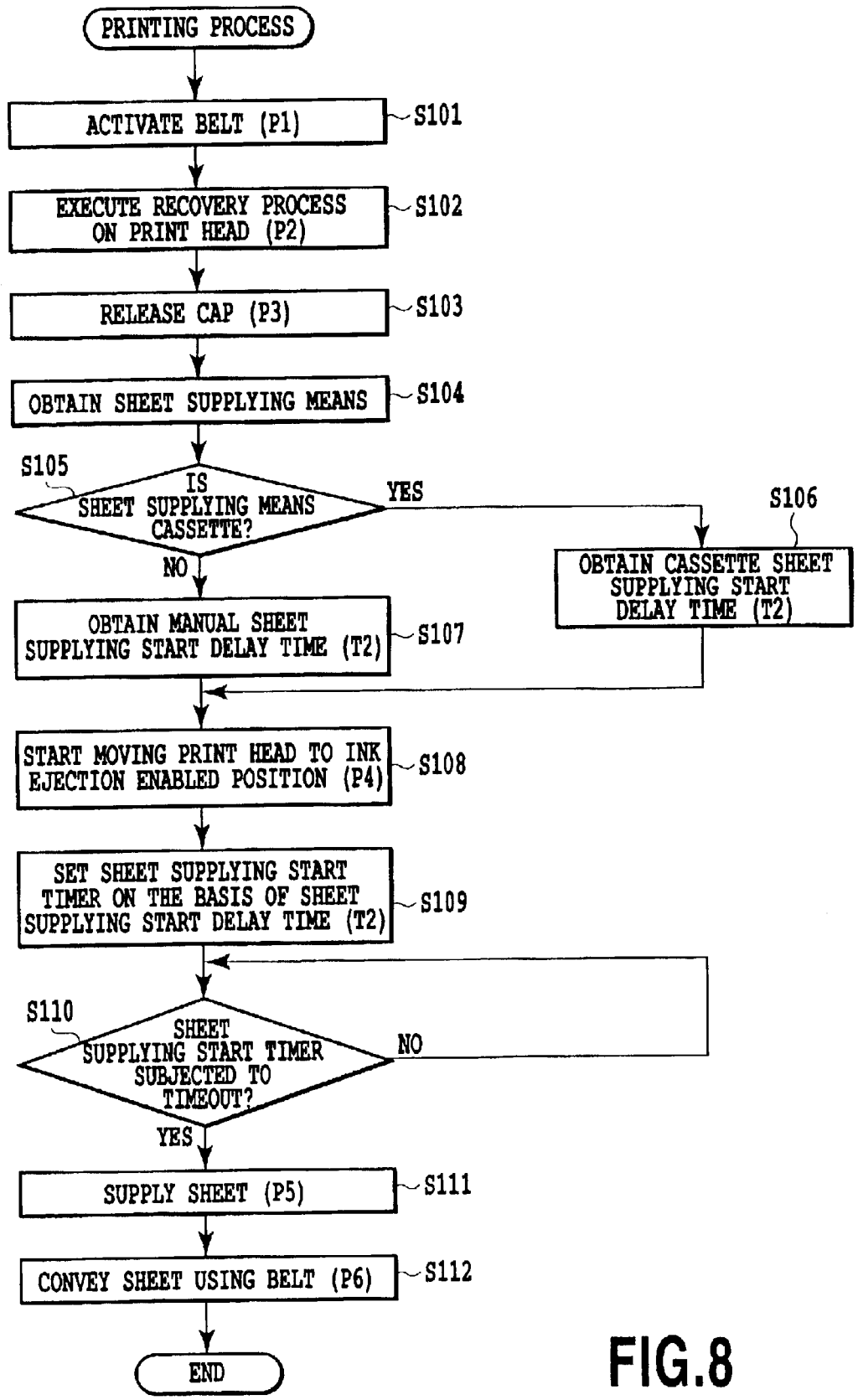
FIG. 8 is a flow chart illustrating a printing process according to the first embodiment of the present invention.

In response to a print request, the printing process in FIG. 8 is executed. First, the conveying belt 31 is activated (P1) (step S101). Then, a predetermined recovery process (P2) is executed on the print head 7 (step S102). This recovery process includes the preliminary ejection of ink into the cap 8 as previously described. After the recovery process for the print head 7 has been completed, the cap 8 covering the print head 7 is released (P3) (step S103). That is, the cap 8 is removed from the print head 7 and retreated so as not to hinder the print head 7 from moving to the ink ejection enabled position, as shown in FIG. 5.

Subsequently, data is obtained indicating which means is used to supply print sheets P ("sheet supplying means") (step S104). The sheet supplying means is then determined on the basis of this data. When the printing sheets P is fed from a "cassette", the sheet supplying start delay time T2 (in the present example, 2,500 ms) corresponding to "cassette sheet supplying" is obtained from the sheet supplying start delay time table in FIG. 9 (step S106). On the other hand, when the printing sheet P is not fed from the cassette, it is determined that the printing sheet P is "manually" fed. Then, the sheet supplying start delay time T2 (in the present example, 3,000 ms) corresponding to "manual sheet supplying" is obtained from the sheet supplying start delay time table in FIG. 9 (step S107). The sheet supplying start delay time table in FIG. 9 is stored in the ROM 80b in FIG. 3. The table contains the sheet supplying start delay times T2 for the respective sheet supplying means.

After the sheet supplying start delay time corresponding to the sheet supplying means has been obtained, the print head 7 is started to move to the ink ejection enabled position (P4) (step S108). That is, vertical movement of the print head 7 is controlled to start lowering the print head 7 to the optimum position for ink ejection (ink ejection enabled position) directly above the conveying belt 31 as shown in FIG. 6.

After such movement of the print head 7 has been started, a sheet supplying start timer is immediately set on the basis of the obtained sheet supplying start delay time (step S109). The sheet supplying start timer is subjected to timeout after the sheet supplying start delay time T2 has passed. Subsequently, upon the timeout of the sheet supplying start timer (step S110), this timeout is detected, and the operation (P5) is started to supply the printing sheet P from the sheet supplying means obtained in step S104 (step S111). Once the supplying operation is completed and the printing sheet P reaches the conveying belt 31, a predetermined sheet conveyance control process is executed to start conveying the printing sheet P on the conveying belt 31 (P6) (step S112). Thus, the printing sheet P passes below the print head 7 together with the conveying sheet 31. An image is then formed using ink ejected from the print head 7.

As described above, according to the first embodiment, the ready period T1 is reduced by allowing the print head moving operation (P4) and the print sheet supplying operation (P5) to temporally overlap each other as shown in FIGS. 7B and 7C. This serves to reduce the time required after the printing apparatus has received a print start signal (print request) and before a printing operation is enabled. Consequently, the time required to print one sheet is reduced. Specifically, the start times of the print head moving operation (P4) and the print sheet supplying operation (P5) are controlled so that the latter is completed simultaneously with the completion of the former (P4). Thus, printing of the printing sheet can be started immediately after the print head preparing operation has been completed. This serves to reduce the time required to print one sheet.

Second Embodiment

In the above described first embodiment, the sheet supplying start delay time T2 is switched depending the sheet supplying means for the printing sheet P. However, the present invention is not limited to this aspect. The optimum sheet supplying start delay time T2 can be set taking into account all elements affecting the time required to supply or convey the printing sheet P. For example, the sheet supplying start delay time T2 can be switched according to printing speed. That is, a more appropriate sheet supplying start delay time T2 can be set by taking into account both sheet supplying means and printing speed.

Figure 10B:
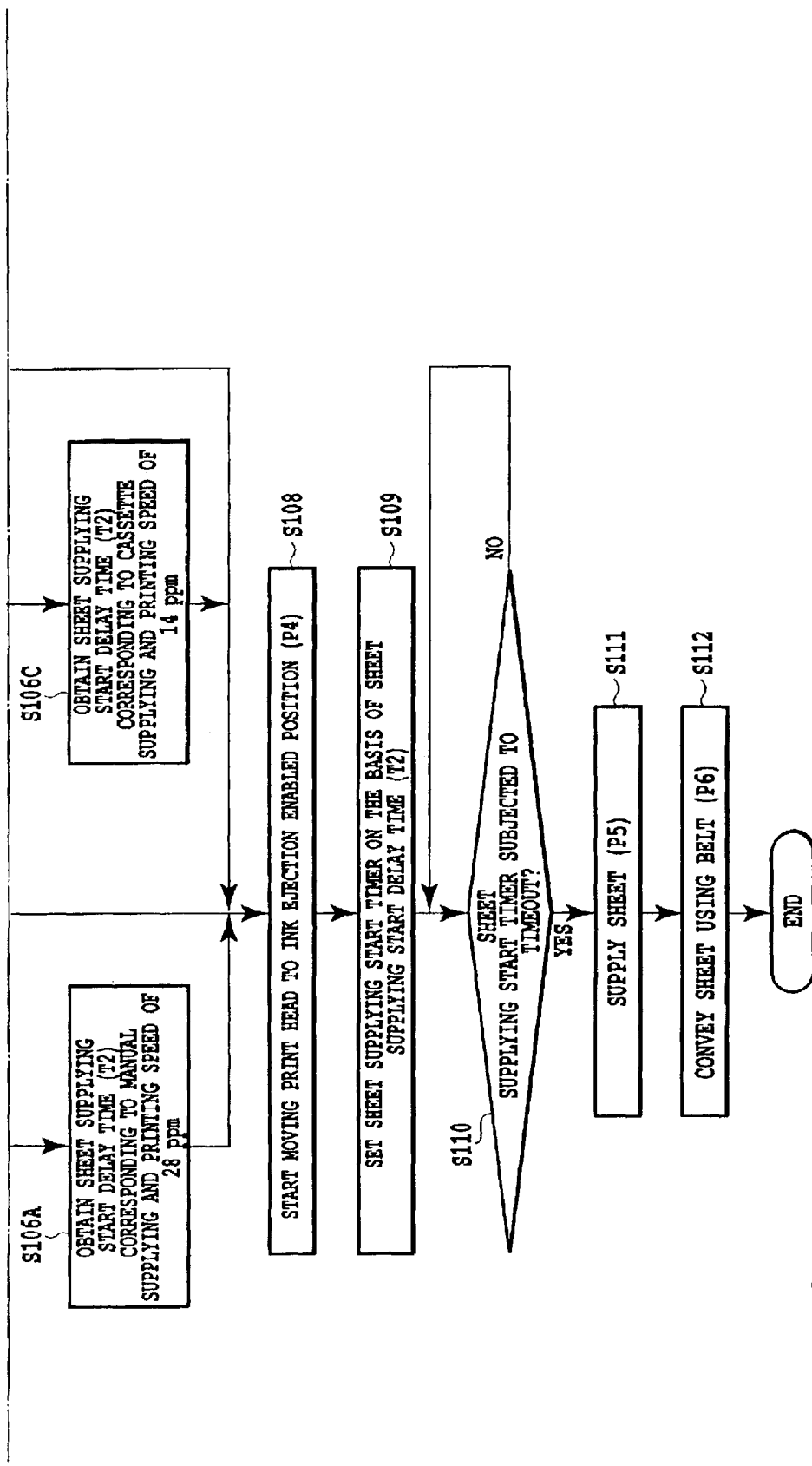
FIG. 10B is a flow chart illustrating a printing process according to a second embodiment of the present invention.

FIG. 10 is a flow chart illustrating a printing process according to the present example. This corresponds to the flow chart of a printing process in FIG. 8, to which steps S104, S105A, S105B, and S106A to S106D taking the printing speed (for example, the number of sheets printed per unit time) into consideration are added.

In the flow chart in FIG. 10, information on the sheet supplying means is obtained in step S104. Then, information on the printing speed during a printing operation is obtained (step S104A). The sheet supplying means is then determined (step S105). Subsequently, the printing speed for the determined sheet supplying means is determined (steps S105A and S105B). In the present example, when the sheet supplying means is the "cassette" or "manual sheet supplying", it is determined whether or not the printing sheet is 28 ppm (page per minute). Then, the sheet supplying start delay time T2 corresponding to each sheet supplying means and printing speed is obtained with reference to a sheet supplying start delay time table such as the one shown in FIG. 10 (S106A to S106D).

In the present example, in step S106A, the sheet supplying start delay time T2 (in the present example, 3,000 ms) corresponding to manual sheet supplying and a printing speed of 28 ppm is obtained. In step S106B, the sheet supplying start delay time T2 (in the present example, 3,200 ms) corresponding to manual sheet supplying and a printing speed of 14 ppm is obtained. Further, in step S106C, the sheet supplying start delay time T2 (in the present example, 2,800 ms) corresponding to cassette sheet supplying and a printing speed of 14 ppm is obtained. In step S106D, the sheet supplying start delay time T2 (in the present example, 2,500 ms) corresponding to cassette sheet supplying and a printing speed of 28 ppm is obtained.

Then, step S109 and succeeding steps similar to those in the previously described embodiment are executed on the basis of the sheet supplying start delay time T2 thus obtained. According to the second embodiment, the sheet supplying start delay time T2 is determined taking into account not only the sheet supplying means but also the printing speed. Consequently, a sheet supplying start delay time T2 more appropriate than that in the first embodiment is obtained. This serves to further reduce the printing time.

Third Embodiment

In the above embodiments, the printing sheet P is fed so as to pass directly below the print head 7K (printing position), located on the most upstream side in the conveying direction of the printing sheet P, immediately after the print head 7K has completed an operation of moving to the ink ejection enabled position directly above the conveying belt 31 (P4). Thus, a start timing for the supplying of the printing sheet P (P5) is set on the basis of the sheet supplying start delay time T2.

However, the present invention is not limited to these aspects. The start timing for the supplying of the printing sheet (P5) may also be set taking into account the fact that different combinations of the print heads are used to form an image depending on print data requested to be printed. For example, if a color image is to be printed, it may be formed using only the color inks (cyan, magenta, and yellow inks) without using black ink. In this case, with the print heads 7 arranged as shown in FIGS. 1 and 2, the black ink print head 7K, arranged on the most upstream side in the conveying direction of the printing sheet P, is not used, while only the second and subsequent print heads 7C, 7M, and 7Y are used. If an image is formed using at least the cyan ink without using the black ink, the start timing for the supplying of the printing sheet P (P5) is set that the printing sheet P moves directly below the second print head 7C immediately after the print head 7C has completed an operation of moving to the ink ejection enabled position directly above the conveying belt 31.

By thus setting the start timing for the supplying of the printing sheet P on the basis of print data, the sheet supplying start delay time T2 can be reduced according to print data. Consequently, the ready period T1 can be further reduced.

Fourth Embodiment

In the above embodiments, the start timing for the supplying of the printing sheet P (P5) is set so that the printing sheet P passes directly below the nozzle section of the print head 7 immediately after the print head 7 has completed an operation of moving to the ink ejection enabled position directly above the conveying belt 31.

However, the present invention is not limited to this aspect. The start timing for the supplying of the printing sheet P (P5) may be set so that the printing sheet P is positioned at a predetermined upstream position in the conveying direction of the printing sheet P immediately after the print head 7 has completed an operation of moving to the ink ejection enabled position. For example, the start timing for the supplying of the printing sheet P (P5) may be set so that the point of time when the printing sheet P for which the supplying operation (P5) has been completed is placed on the conveying belt 31 coincides with the point of time when the print head 7 completes an operation of moving to the ink ejection enabled position.

Fifth Embodiment

The above embodiments use a sheet supplying start delay time table such as the one shown in FIG. 9 or 11. The sheet supplying start delay time table contains sheet supplying start delay times T2 corresponding to the respective sheet supplying means and printing speeds.

However, the present invention is not limited to this aspect. For example, the following information may be saved to the ROM beforehand: the distance from the most upstream end of the conveying belt 31 in the conveying direction to the position of the print head 7K, the speed at which the printing sheet P is conveyed by the conveying belt 31, the time required to move the print head 7 (movement time), and the like. Then, this information may be used to calculate the sheet supplying start delay time T2 corresponding to a combination of the two conditions, the sheet supplying means and the printing speed.

Sixth Embodiment

In the previously described embodiments, control programs and data stored in the ROM 80b are loaded into the memory 80c for execution.

Figure 12:
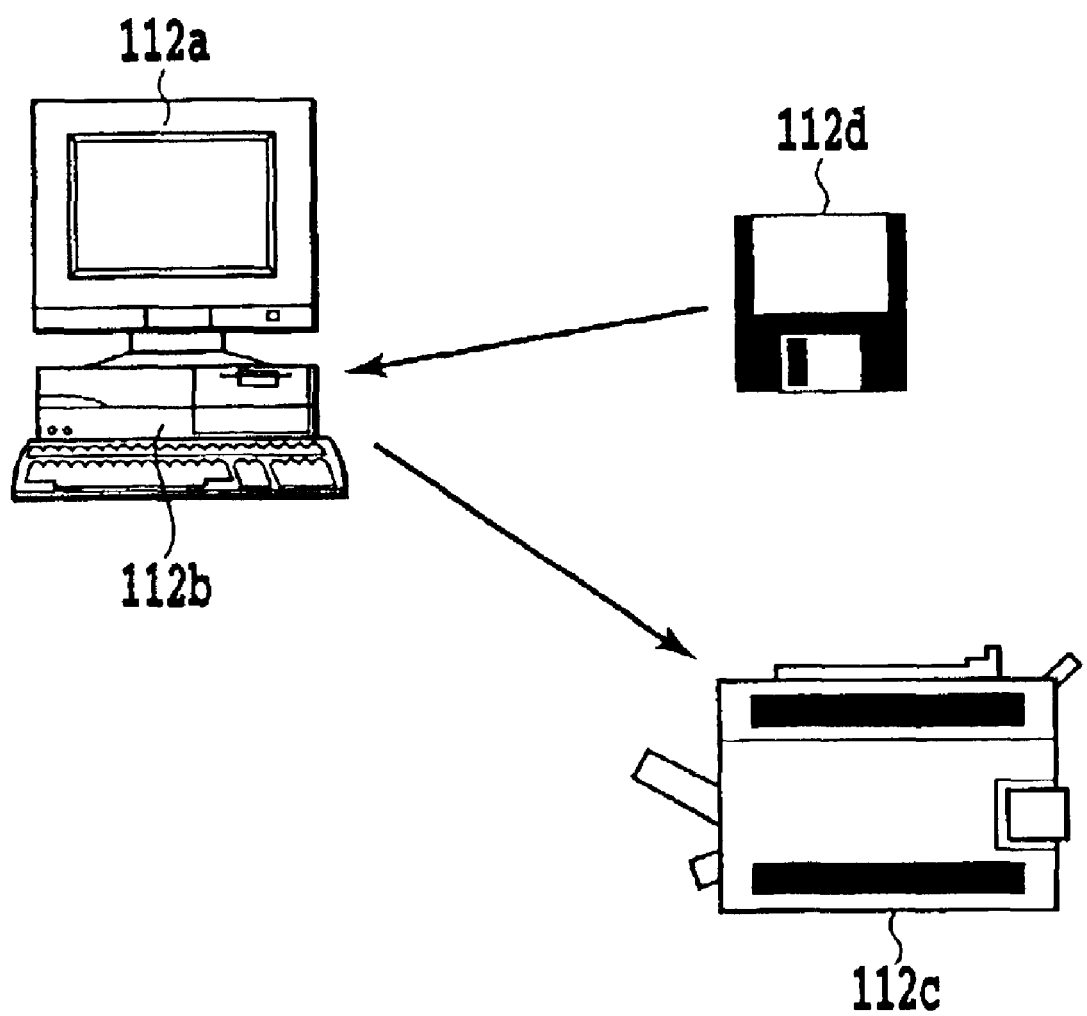
FIG. 12 is a diagram illustrating a control program and a mode of data supply according to a sixth embodiment of the present invention.

However, as shown in FIG. 12, a host computer 112a may be used to which an external storage device 112b is connected. That is, the computer 112a may read control programs and data recorded in a flexible disk 112d or the like. It may then store the control programs and data in the flash memory 80b, provided in the ink-jet printing apparatus 112c. Then, the control programs and data may be loaded into the memory 80c. Further, the medium in which control programs and data are recorded may be a CD-ROM, an IC memory card, or the like instead of the flexible disk 112d.

Figure 13:
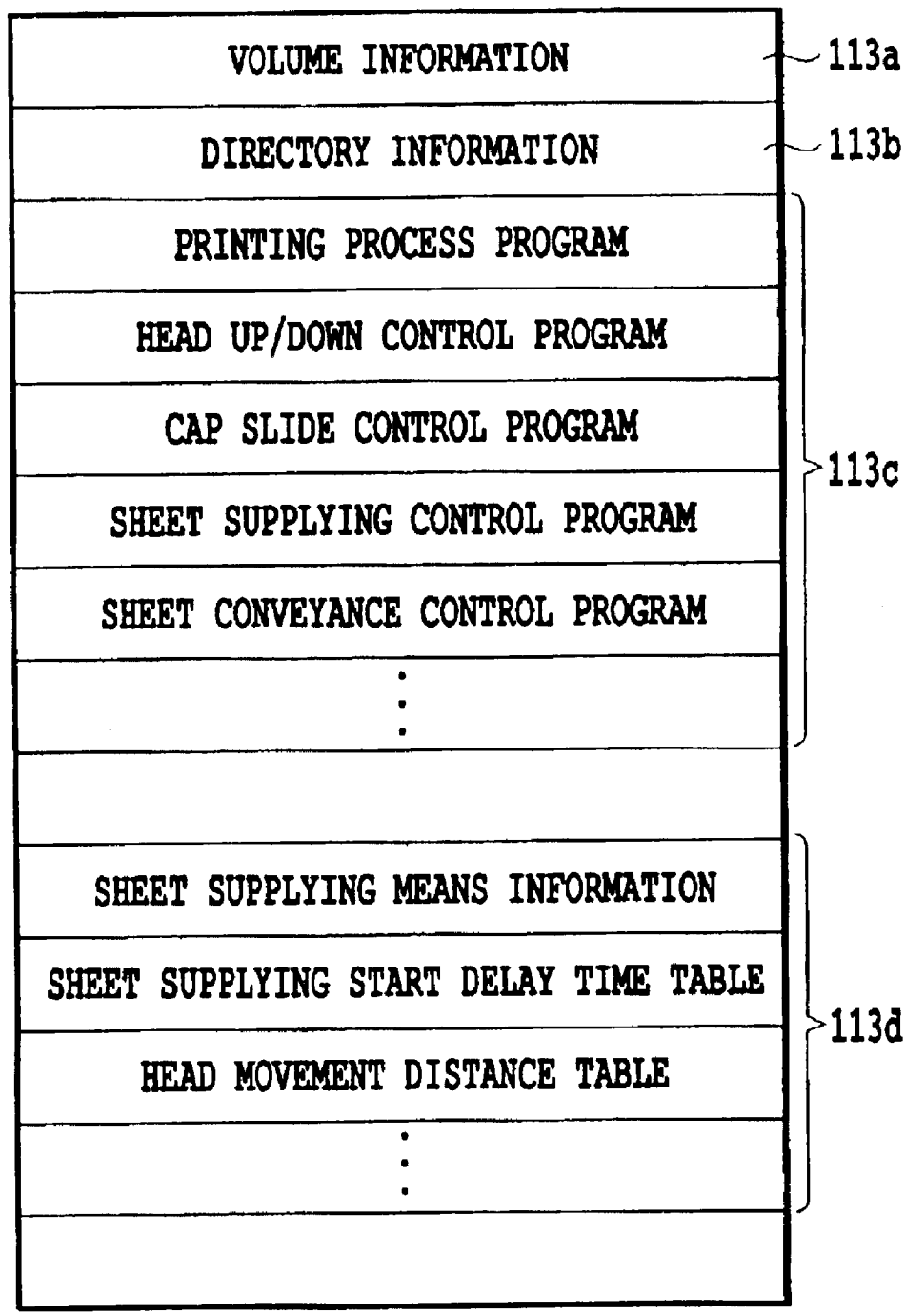
FIG. 13 is a chart illustrating a memory map that can be recorded in an external recording medium in FIG. 12.

The flexible disk 112b can store a memory map such as the one shown in FIG. 13. In this case, a control program may be supplied by allowing a flexible disk drive connected to the host computer 112a to read a stored content from the flexible disk 112b and then transferring the read content to the ink-jet printing apparatus 112c. The memory map in FIG. 12 has a volume information stored area 113a, a directory information stored area 113b, a control program stored area 113c in which predetermined control programs (a printing process program, a sheet supplying control program, and others), and a data stored area 113d in which data (sheet supplying means information, a sheet supplying start delay time table, and others) used for the control programs is stored. Accordingly, the flexible disk 112d in which such a memory map is recorded constitutes a medium in which control programs used to provide control according to the present invention (including the previously described embodiments) are recorded.

Seventh Embodiment

In the above described embodiments, the print head moving operation (P4) and the printing sheet supplying operation (P5) are allowed to temporally overlap each other so that the latter is completed simultaneously with the completion of the former (P4), i.e. the point of time when the print head moving operation is completed coincides with the point of time when the printing sheet supplying operation is completed. With such a configuration, as described above, once the print head reaches the ink ejection enabled position, printing of the printing sheet is enabled. Consequently, the printing time can be reduced compared to FIG. 7A, showing the conventional example.

However, the present invention is not limited to the configuration in which the point of time when the print head moving operation is completed coincides with the point of time when the printing sheet supplying operation is completed. That is, to reduce the printing time compared to FIG. 7A, showing the conventional example, it suffices to allow the print head moving operation (P4) and the printing sheet supplying operation (P5) to temporally overlap each other without matching the point of time when the print head moving operation is completed with the point of time when the printing sheet supplying operation is completed. In other words, the printing sheet conveying operation has only to be started before the print head preparing operation is completed. With this configuration, the degree to which the printing time is reduced is smaller than in the above described embodiments. However, this configuration reduces the printing time compared to FIG. 7A, showing the conventional example.

Thus, according to the present invention, such control has only to be provided that after the print head preparing operation has been completed, the printing medium can reach a position opposite to the print head in a relatively short time. That is, the print head moving operation (P4) and the printing sheet supplying operation (P5) have only to be controlled so that the operation of transporting the printing medium to the position (printing enabled position) opposite to the print head is completed substantially simultaneously with the completion of the print head preparing operation.

Eighth Embodiment

In the above described embodiments, the determination of sheet supplying means (cassette or manual sheet supplying) is followed by the obtainment of the sheet supplying start delay time T2 corresponding to the sheet supplying means. However, only one sheet supplying means may be present. For example, some printing apparatus use only manual or cassette sheet supplying. In this case, naturally, the operation of determining sheet supplying means is not executed. That is, steps S104 and S105 in FIG. 8 according to the first embodiment are not present. Specifically, in a printing apparatus using only "manual sheet supplying", steps S104, S105, and S106 in FIG. 8 are not present. Thus, a printing process is executed so that step S103 is followed by step S107. On the other hand, in a printing apparatus using only "cassette sheet feeding", steps S104, S105, and S107 in FIG. 8 are not present. Thus, a printing process is executed so that step S103 is followed by step S106.

This also applies to the flow chart in FIG. 10 according to the second embodiment. In a printing apparatus using only "manual sheet supplying", steps S104, S105, S105B, S106C, and S106D in FIG. 10 are not present. On the other hand, in a printing apparatus using only "cassette sheet supplying", steps S104, S105, S105A, S106A, and S106B in FIG. 10 are not present.

Thus, according to the eighth embodiment, it is unnecessary to perform the operation of determining sheet supplying means (cassette or manual supplying). This simplifies the control process for the above described preparing operation compared to the above described embodiments. It is thus possible to reduce the time required for the preparing operation.

Ninth Embodiment

In the description of the above embodiments, the time required to move the print head (P4) is longer than the time required to supply the printing sheet (P5). However, the present invention is not limited to this aspect. That is, the present invention is applicable to the case in which the time required to supply the printing sheet (P5) is longer than the time required to move the print head (P4) in contract with the above described embodiments.

In this case, when the movement of the print head (P4) is started after the start of sheet supplying (P5), the print head preparing operation is started before the printing medium supplying operation (transporting operation) is completed. Then, the movement of the print head can be completed simultaneously with the arrival of the printing sheet P at the position (where a printing operation can be executed using the print head) opposite to the print head as in the case with the previously described embodiments.

Thus, it is only necessary to be able to control the print head preparing operation and the printing medium transporting (supplying) operation so that one of them is started before the other is completed. In particular, the delay time T2 between the starts of the print head preparing operation and printing medium transporting operation is preferably controlled so that one of them is started before the other is completed.

Tenth Embodiment

In the above described embodiments, sheet supplying start delay times already adjusted to appropriate values are stored in the ROM 80b so that any of these values can be obtained and always used. However, the present invention is not limited to this aspect. Operations can be stabilized at the start of a printing process by configuring the apparatus so that a proper sheet supplying start delay time can be dynamically obtained even if the movement time of the print head varies because of aging or a load change.

The present embodiment will be described below with reference to the flow charts in FIGS. 14 and 15 and the table in FIG. 16.

Figure 14B:
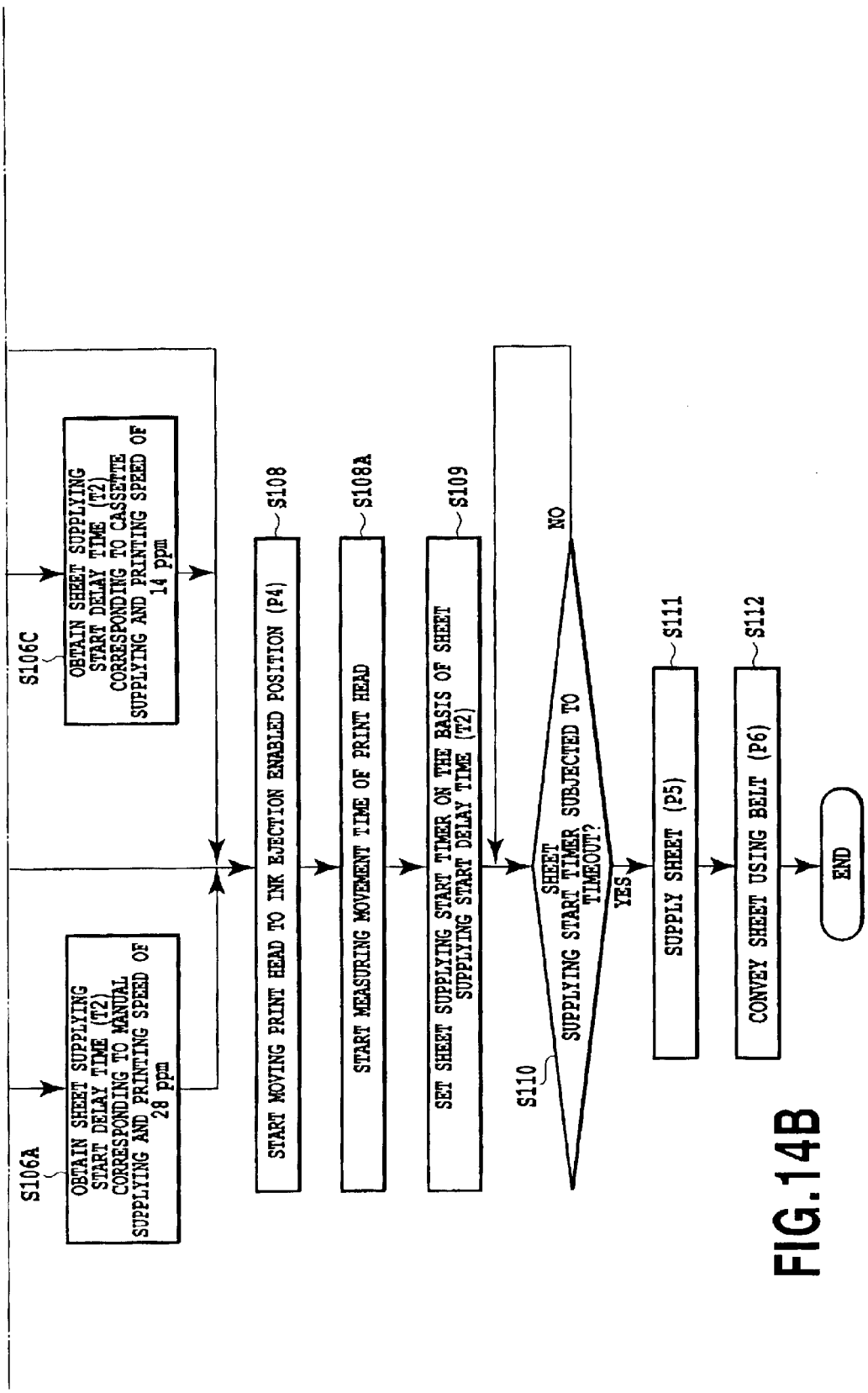
FIG. 14B is a flow chart illustrating a printing process according to a tenth embodiment of the present invention.
Figure 15:
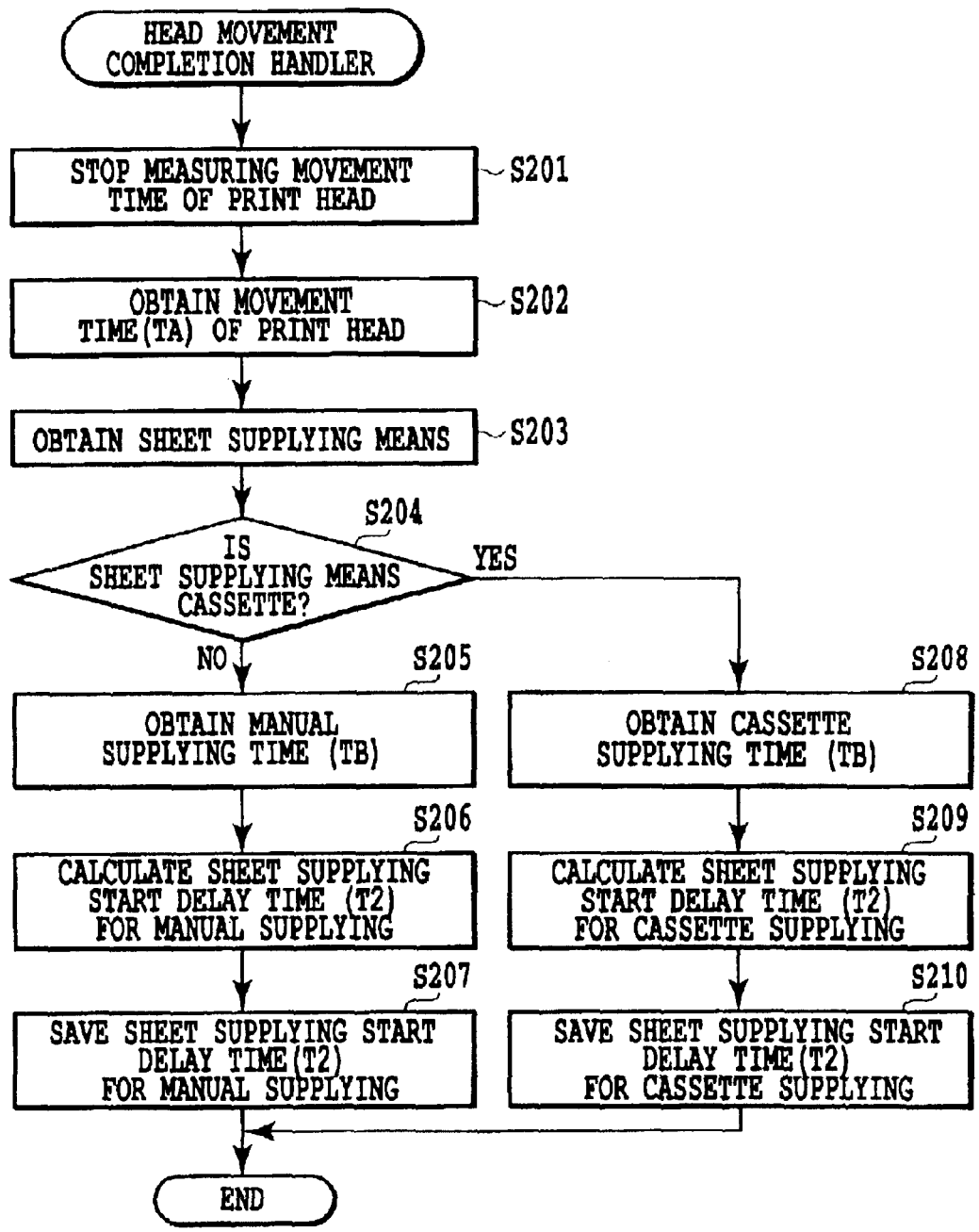
FIG. 15 is a flow chart illustrating a head movement completion handler according to the tenth embodiment of the present invention.

As in the case with the flow charts in FIGS. 6 and 7 according to the above described embodiments, a print request causes the printing process in the flow chart in FIG. 14 to be activated. The processing from step S101 to S108 is similar to that in the flow chart in FIG. 12. In step S108, the print head starts moving to the ink ejection enabled position (P4). Immediately after this, the movement time of the print head is started to be measured (step S108A). Specifically, a 1-ms timer counter is initialized which is provided to measure the movement time of the print head 7. Subsequently, the timer counter counts up every 1 ms, when a timer interruption occurs. Step S110 and succeeding steps are executed as in the case with the flow chart in FIG. 12 to complete the printing process.

In the present embodiment, a sheet supplying start time delay table such as the one shown in FIG. 11, previously described, is provided in the RAM 80c. Then, in steps S106A, S106B, S106C, and S106D, the updated latest sheet supplying start delay time T2 is obtained with reference to this sheet supplying start delay time table. However, when a printing process is executed for the first time after the initialization of the RAM 80c, the latest sheet supplying start delay time T2 has not been saved to the RAM 80b. Thus, an initialized default sheet supplying start delay time T2 is obtained from the sheet supplying start delay time stored in the ROM 80b.

During the printing process shown in the flow chart in FIG. 14, when the print head 7, which started moving to the ink ejection enabled position (printing enabled position) in step S108, completes this operation, a movement completion interruption occurs. This invokes a print head movement completion handler already incorporated in the apparatus as an interruption process handler shown in the flow chart in FIG. 13.

The print head movement completion handler, shown in FIG. 13, first stops the measurement of movement time of the print head 7 (step S201). Specifically, the handler stops the counter for measuring the movement time of the print head 7, which counter has been counting up every 1 ms since its initialization at the start of measurement of the movement time of the print head 7. Subsequently, the handler reads a count from the counter and then transforms it into a time in ms. The handler thus obtains the time TA required by the print head to move to the ink ejection enabled position and then saves it to the RAM 80c (step S202).

Subsequently, the handler obtains data on the sheet supplying means for the printing sheet P in the current printing process (step S203). The handler then determines sheet supplying means on the basis of the data obtained (step S204). If the sheet supplying means is the "cassette", the handler obtains a sheet supplying time TB for cassette supplying stored in the ROM 80b as illustrated in FIG. 16 (step S205). The sheet supplying time TB has already been measured and stored in the ROM 80b. Then, the handler calculates a sheet supplying start delay time T2 for cassette supplying using the equation below on the basis of the movement time TA of the print head and the sheet supplying time TB for cassette supplying, both of which have already been obtained (step S206).

$$T2 = TA - TB - \alpha$$

However, it is necessary that TA>TB.

The coefficient $\alpha$ is required to shorten the sheet supplying start delay time T2 in order to stabilize the sheet supplying (P5) operation.

Subsequently, the handler rewrites the sheet supplying start delay time table in FIG. 11, provided in the RAM 80c, with the sheet supplying start delay time T2 for cassette supplying calculated using the above equation. The handler thus updates the value of the sheet supplying start delay time T2 for cassette supplying (step S207).

On the other hand, if the handler determines in step S204 that the sheet supplying means is not the "cassette", then it obtains a sheet supplying time TB for manual supplying stored in the ROM 80b as illustrated in FIG. 16 (step S208). The sheet supplying time TB has already been measured and stored in the ROM 80b. Then, the handler calculates a sheet supplying start delay time T2 for manual supplying using the above equation on the basis of the movement time TA of the print head and the sheet supplying time TB for manual supplying, both of which have already been obtained (step S209). Subsequently, the handler rewrites the sheet supplying start delay time table in FIG. 11, provided in the RAM 80c, with the sheet supplying start delay time T2 for manual supplying calculated using the above equation. The handler thus updates the value of the sheet supplying start delay time T2 for manual supplying (step S210).

Eleventh Embodiment

In the above described tenth embodiment, only the movement time TA of the print head 7 is dynamically measured as a parameter used to calculate the sheet supplying start delay time T2. The value obtained is then reflected in the subsequent calculation.

However, the present invention is not limited to this aspect. The sheet supplying time TB, another parameter used to calculate the sheet supplying start delay time T2, may be dynamically measured. This serves to obtain a more proper sheet supplying start delay time T2.

Twelfth Embodiment

In the above described tenth and eleventh embodiments, a sheet supplying start delay time T2 newly obtained is provided on the sheet supplying start delay time table in the RAM 80c as an optimum value subsequently referenced.

However, the present invention is not limited to this aspect. If an error occurs in an operation of moving the print head 7 (P4) or supplying the printing sheet (P5) during a printing process to temporarily and significantly vary the movement time TA of the print head 7 and the sheet supplying time TB, past data can be used to avoid obtaining an inappropriate value for the sheet supplying start delay time T2. That is, taking N past values for the sheet supplying start delay time T2 into consideration, an averaged sheet supplying start delay time can be calculated and used. Two methods of calculating the average sheet supplying start delay time are shown below. Average sheet supplying start delay time={(last average sheet supplying start delay time)×N+(current average sheet supplying start delay time)}÷{N+1} Average sheet supplying start delay time={Σi=1~N (past sheet supplying start delay time i)+(current average sheet supplying start delay time)}÷{N+1}

Other Embodiments

The present invention is widely applicable not only to ink-jet printing apparatuses using an ink-jet print head but also to various ink-jet printing apparatuses using various print heads based on methods other than the ink-jet method.

Further, if a series of print head preparing operations include the recovery of the print head (P2), the releasing of the cap (P3), and the movement of the print head (P4) and the time required for this preparing operation can be obtained as preparation time, then the delay time T2 can be determined using as a reference a predetermined operational period during the preparing operation. For example, the delay time T2 can be determined using as a reference the time to start recovery of the print head (P2) or release the cap (P3).

Further, the releasing of the cap (P3) is not limited to the operation of sliding the cap 8 after the print head has been retreated upward as shown in FIG. 5. For example, the cap 8 can be slid after retreating the cap 8 downward instead of retreating it upward. In this case, the movement of the print head (P4) is an operation of moving the print head 7 from the position shown in FIG. 4 to the position shown in FIG. 6. Furthermore, the cap 8 may be removed from the print head 7 by being rotationally moved.

Further, the movement of the print head (P4) is an operation of moving the print head to the position at which the printing medium can be printed. The moving direction is toward the transported printing medium. For example, if the transported printing medium is laterally opposite the print head, the movement of the print head (P4) is such that the print head moves rightward or leftward to the printing medium. Alternatively, rather than moving the print head, the position of the conveying path for the printing medium may be moved toward the print head.

Further, it should be appreciated that the object of the present invention is accomplished by supplying a system or an apparatus with a recording medium in which program codes for software implementing the functions of the previously described embodiments are recorded and then allowing a computer (or CPU or MPU) in the system or apparatus to read and execute the program codes stored in the recording medium.

In this case, the program codes read from the recording medium themselves implement the functions of the previously described embodiments. The recording medium in which the program codes are recorded constitutes the present invention.

The recording medium for supplying the program codes may be, for example, a floppy disk, a hard disk, an optical disk, a photomagnetic disk, a CD-ROM, a CD-R, a magnetic tape, a non-volatile memory card, a ROM, or the like. Further, it is needless to say that the functions of the previously described embodiments may be implemented not only by executing the program codes read by the computer but also by allowing an OS (operating system) or the like operating on the computer to execute some or all of the corresponding processes on the bases of instructions from the program codes.

Furthermore, it goes without saying that the functions of the previously described embodiments may be implemented by writing the program codes read from the recording medium in a memory provided in an expanded board inserted into the computer or an expanded unit connected to the computer and then allowing a CPU or the like provided in the expanded board or unit to execute some or all of the corresponding processes.

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A printing apparatus performing, according to an input print start signal, a preparing operation for a print head used to print on a printing medium and a supplying operation of supplying the printing medium to a printing enabled position which is opposite the print head and at which a printing process can be executed using the print head, said apparatus comprising:

control means for controlling the preparing operation for the print head and the supplying operation of the printing medium so that one of these operations is started before the other operation is completed and the one operation and the other operation temporally overlap each other;

conveying means for conveying the printing medium supplied in the supplying operation;

printing means for printing by discharging ink from the print head without moving the print head during a conveying operation of the printing medium by said conveying means, the print head comprising a plurality of nozzles arrayed in a direction orthogonal to the conveying direction; and a cap unit for capping the nozzles of the print head during a non-printing period, wherein the preparing operation includes a releasing operation for releasing the print head from said cap unit and a moving operation for moving the print head to a print enabled position by moving the print head downward.

2. A printing apparatus as claimed in claim 1, wherein said control means controls the preparing operation and the supplying operation so that these operations are completed substantially simultaneously.

3. A printing apparatus as claimed in claim 2, wherein said control means controls a delay time corresponding to a time difference between a start time of the preparing operation and a start time of the supplying operation so that these operations are completed substantially simultaneously.

4. A printing apparatus as claimed in claim 1, wherein said control means obtains a delay time corresponding to a time difference between a start time of the preparing operation and a start time of the supplying operation on the basis of information on supplying means for supplying the printing medium to the printing enabled position, and starts the preparing operation and the supplying operation on the basis of the delay time obtained.

5. A printing apparatus as claimed in claim 1, wherein said control means obtains a delay time corresponding to a time difference between a start time of the preparing operation and a start time of the supplying operation on the basis of information of printing speed, and starts the preparing operation and the supplying operation on the basis of the delay time obtained.

6. A printing apparatus as claimed in claim 1, wherein the releasing operation is performed by moving the print head upward.

7. A printing apparatus as claimed in claim 1, further comprising:

a cap moving mechanism that moves said cap unit to a downstream side in the conveying direction of the printing medium.

8. A printing apparatus as claimed in claim 1, wherein said control means controls a delay time corresponding to a time difference between a start time of the preparing operation and a start time of the supplying operation so that the one operation is started before the other operation is completed.

9. A printing apparatus performing, according to an input print start signal, a preparing operation for a print head used to print on a printing medium and a supplying operation of supplying the printing medium to a printing enabled position which is opposite the print head and at which a printing process can be executed using the print head, said apparatus comprising:

control means for controlling the preparing operation for the print head and the supplying operation of the printing medium so that one of these operations is started before the other operation is completed, wherein said control means starts the preparing operation before the supplying operation if time required for the preparing operation is longer than time required for the supplying operation.

10. A control method of controlling a printing apparatus performing, according to an input print start signal, a preparing operation for a print head used to print on a printing medium and a supplying operation of supplying the printing medium to a printing enabled position which is opposite the print head and at which a printing process can be executed using the print head, said method comprising:

a control step of controlling the preparing operation for the print head and the supplying operation of the printing medium so that one of these operations is started before the other operation is completed and the one operation and the other operation temporally overlap each other;

a conveying step of conveying the printing medium supplied in the supplying operation;

a printing step of printing by discharging ink from the print head without moving the print head during a conveying operation of the printing medium in said conveying step, the print head comprising a plurality of nozzles arrayed in a direction orthogonal to the conveying direction; and a capping step of capping the nozzles of the print head during a non-printing period by a cap unit, wherein the preparing operation includes a releasing operation for releasing the print head from the cap unit and a moving operation for moving the print head to a print enabled position by moving the print head downward.

11. A method of controlling a printing apparatus as claimed in claim 10, wherein in said control step, the preparing operation and the supplying operation are controlled so that these operations are completed substantially simultaneously.

12. A method of controlling a printing apparatus as claimed in claim 10, wherein in said control step, a delay time corresponding to a time difference between a start time of the preparing operation and a start time of the supplying operation is controlled so that these operations are completed substantially simultaneously.

13. A method of controlling a printing apparatus as claimed in claim 10, wherein in said control step, the preparing operation and the supplying operation are controlled according to at least one of a measured value of the time required for the preparing operation and a measured value of the time required for the supplying operation.

14. A method of controlling a printing apparatus as claimed in claim 10, wherein in said control step, the preparing operation and the supplying operation are controlled according to a status of a last printing operation.

15. A method of controlling a printing apparatus as claimed in claim 10, wherein in said control step, the preparing operation and the supplying operation are controlled according to a status of a predetermined number of past printing operations.

16. A printing apparatus performing, according to an input print start signal, a preparing operation for a print head used to print on a printing medium and a supplying operation of supplying the printing medium to a printing enabled position which is opposite the print head and at which a printing process can be executed using the print head, said apparatus comprising:

control means for controlling the preparing operation for the print head and the supplying operation of the printing medium so that one of these operations is started before the other operation is completed, wherein said control means controls the preparing operation and the supplying operation according to a status of a printing operation, and wherein said control means controls the preparing operation and the supplying operation according to at least one of a measured value of the time required for the preparing operation and a measured value of the time required for the supplying operation.

17. A printing apparatus performing, according to an input print start signal, a preparing operation for a print head used to print on a printing medium and a supplying operation of supplying the printing medium to a printing enabled position which is opposite the print head and at which a printing process can be executed using the print head, said apparatus comprising:

control means for controlling the preparing operation for the print head and the supplying operation of the printing medium so that one of these operations is started before the other operation is completed, wherein said control means controls the preparing operation and the supplying operation according to a status of a last printing operation.

18. A printing apparatus performing, according to an input print start signal, a preparing operation for a print head used to print on a printing medium and a supplying operation of supplying the printing medium to a printing enabled position which is opposite the print head and at which a printing process can be executed using the print head, said apparatus comprising:

control means for controlling the preparing operation for the print head and the supplying operation of the printing medium so that one of these operations is started before the other operation is completed, wherein said control means controls the preparing operation and the supplying operation according to a status of a predetermined number of past printing operations.

\* \* \* \* \*